(12) United States Patent
Cooper et al.

(10) Patent No.: US 12,528,497 B2
(45) Date of Patent: *Jan. 20, 2026

(54) SYSTEMS AND METHODS FOR DETECTING AN ENVIRONMENT EXTERNAL TO A PERSONAL MOBILE VEHICLE IN A FLEET MANAGEMENT SYSTEM

(71) Applicant: Lyft, Inc., San Francisco, CA (US)

(72) Inventors: Ashley John Cooper, San Francisco, CA (US); Alison Marie Thurber, San Francisco, CA (US); Eahab Nagi El Naga, San Francisco, CA (US); Christy Fernandez Cull, Sunnyvale, CA (US); Abdullah Ahsan Zaidi, San Diego, CA (US)

(73) Assignee: Lyft, Inc., San Francisco, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/770,515

(22) Filed: Jul. 11, 2024

(65) Prior Publication Data

US 2024/0359703 A1 Oct. 31, 2024

Related U.S. Application Data

(63) Continuation of application No. 17/859,881, filed on Jul. 7, 2022, now Pat. No. 12,065,158.

(Continued)

(51) Int. Cl.
*B60W 50/14* (2020.01)
*B60W 40/06* (2012.01)
(Continued)

(52) U.S. Cl.
CPC ............ *B60W 50/14* (2013.01); *B60W 40/06* (2013.01); *G01S 13/86* (2013.01); *G01S 13/89* (2013.01);
(Continued)

(58) Field of Classification Search
CPC ................ B60W 50/14; B60W 40/06; B60W 2050/146; B60W 2420/403;
(Continued)

(56) References Cited

U.S. PATENT DOCUMENTS

2005/0065687 A1* 3/2005 Hijikata ................ G01S 17/931
701/41
2007/0080825 A1* 4/2007 Shiller ................... G08G 1/166
340/903

(Continued)

*Primary Examiner* — Brian A Zimmerman
*Assistant Examiner* — Cal J Eustaquio
(74) *Attorney, Agent, or Firm* — Baker Botts L.L.P.

(57) ABSTRACT

In one embodiment, a method includes a computing system obtaining, via one or more sensors of a personal mobile vehicle (PMV), a reflection signal indicating a characteristic of a road surface of an environment external to the PMV. The computing system may determine one or more characteristic factors of the road surface of the environment external to the PMV based on the reflection signal. The computing system may generate a vulnerable road user (VRU) classification probability distribution by using a machine learning classifier. The VRU classification probability distribution indicates whether a combination of the one or more characteristic factors is associated with the VRU. The computing system may determine, based on the VRU classification probability distribution, that the road surface is associated with the VRU. The computing system may present an alert message to a display associated with the PMV.

20 Claims, 19 Drawing Sheets

Related U.S. Application Data

(60) Provisional application No. 63/231,159, filed on Aug. 9, 2021.

(51) Int. Cl.
  *G01S 13/86* (2006.01)
  *G01S 13/89* (2006.01)

(52) U.S. Cl.
  CPC . *B60W 2050/146* (2013.01); *B60W 2420/403* (2013.01); *B60W 2420/408* (2024.01); *B60W 2420/54* (2013.01)

(58) Field of Classification Search
  CPC ....... B60W 2420/408; B60W 2420/54; B60W 2300/36; G01S 13/86; G01S 13/89; G01S 7/412; G01S 7/415; G01S 13/862; G01S 7/417; G01S 13/931; G01S 13/867
  See application file for complete search history.

(56) References Cited

U.S. PATENT DOCUMENTS

| | | | | |
|---|---|---|---|---|
| 2016/0318437 | A1* | 11/2016 | Vilakathara | H05B 47/125 |
| 2017/0328985 | A1* | 11/2017 | Enderli | G01S 7/414 |
| 2020/0202145 | A1* | 6/2020 | Mao | G05D 1/0221 |
| 2022/0402517 | A1* | 12/2022 | Sicconi | B60W 40/08 |

* cited by examiner

SYSTEMS AND METHODS FOR DETECTING AN ENVIRONMENT EXTERNAL TO A PERSONAL MOBILE VEHICLE IN A FLEET MANAGEMENT SYSTEM

CROSS REFERENCE(S)

This application is a continuation under 35 U.S.C. § 120 of U.S. patent application Ser. No. 17/859,881, filed on 7 Jul. 2022, which is a nonprovisional of and claims priority under 35 U.S.C. 119 to U.S. provisional application No. 63/231,159, filed on Aug. 9, 2021, each of which is hereby expressly incorporated by reference herein in its entirety.

FIELD OF THE INVENTION

The present technology relates to vehicle systems and fleet management systems. More particularly, the present technology relates to systems, apparatus, and methods for detecting an environment external to a personal mobile vehicle (PMV) in a fleet management system.

BACKGROUND

Commercial PMVs, such as bicycles, scooters, electric skateboards, and/or the like, have been widely used by a fleet management system to be shared among riders. Such PMVs, due to its light weight and ability to accelerate and travel at a high speed, may often cause safety issues. For example, when the PMV is traveling on the sidewalk, it may crash into obstacles such as a light pole, a road block, and/or the like, or even hit a pedestrian, causing bodily harm to both the rider and the pedestrian. For another example, when the PMV is traveling at a high speed but switches from a dry and smooth area in the road to a wet and muddy area, the PMV may be in danger of tipping over as the front wheel of the PMV may be compelled to slow down for safety and control reasons. For another example, some cities may have locally banned PMV traffic on sidewalks for public safety concerns, and thus the fleet management system may have needs in substantiating PMV awareness of sidewalks.

Therefore, there is a need to improve travel safety of PMVs in a fleet management system.

SUMMARY

Various embodiments of the present technology can include systems, methods, and non-transitory computer readable media configured to detect an environment external to a personal mobile vehicle (PMV) in a fleet management system. Specifically, a personal mobile vehicle (PMV) is provided for riding on a road surface and managed by a fleet management system. The PMV includes a frame carrying at least one wheel, a radar sensor carried by the frame of the PMV. The radar sensor is configured to (i) emit an electromagnetic wave signal towards an environment external to the PMV, and (ii) receive a reflection pattern indicating a characteristic of the road surface of the environment external to the PMV. The PMV further comprises a processing unit communicatively coupled to the radar sensor. The processing unit being configured to determine one or more characteristic factors of the road surface of the environment external to the PMV according to the reflection pattern, determine, based on the one or more characteristic factors, a classification of a type of the road surface, determine whether the classified type of the road surface is associated with a road surface type of concern, and present an alert message to a display associated with the PMV in response to determining that the surrounding includes the road surface type of concern.

A computer-implemented method of receiving road condition information from PMVs is provided. The method comprises, by a fleet management system: receiving, from a first PMV, a first signal indicating whether a first surrounding of the first PMV includes at least one of a first vulnerable road user (VRU) or a first road surface type of concern, obtaining first location information of a first user associated with the first PMV, receiving, from a second PMV, a second signal indicating whether a second surrounding of the second PMV includes at least one of a second VRU or a second road surface type of concern, obtaining second location information of a second user associated with the second PMV, and transmitting, to the first PMV, information on whether the second surrounding of the second PMV includes at least one of the second VRU or the second road surface type of concern and the second location information.

A non-transitory processor-readable medium storing processor-executable instructions for sensing a surrounding of a personal mobile vehicle (PMV) is provided. The processor-executable instructions executed by a processor to perform operations comprising: obtaining, via a radar sensor carried by a frame of the PMV, a reflection pattern indicating a characteristic of a road surface of an environment external to the PMV, determining one or more characteristic factors of the road surface of the environment external to the PMV according to the reflection pattern, determining, based on the one or more characteristic factors, a classification of a type of the road surface, determining whether the classified type of the road surface is associated with a road surface type of concern, and presenting an alert message to a display associated with the PMV in response to determining that the surrounding includes the road surface type of concern.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
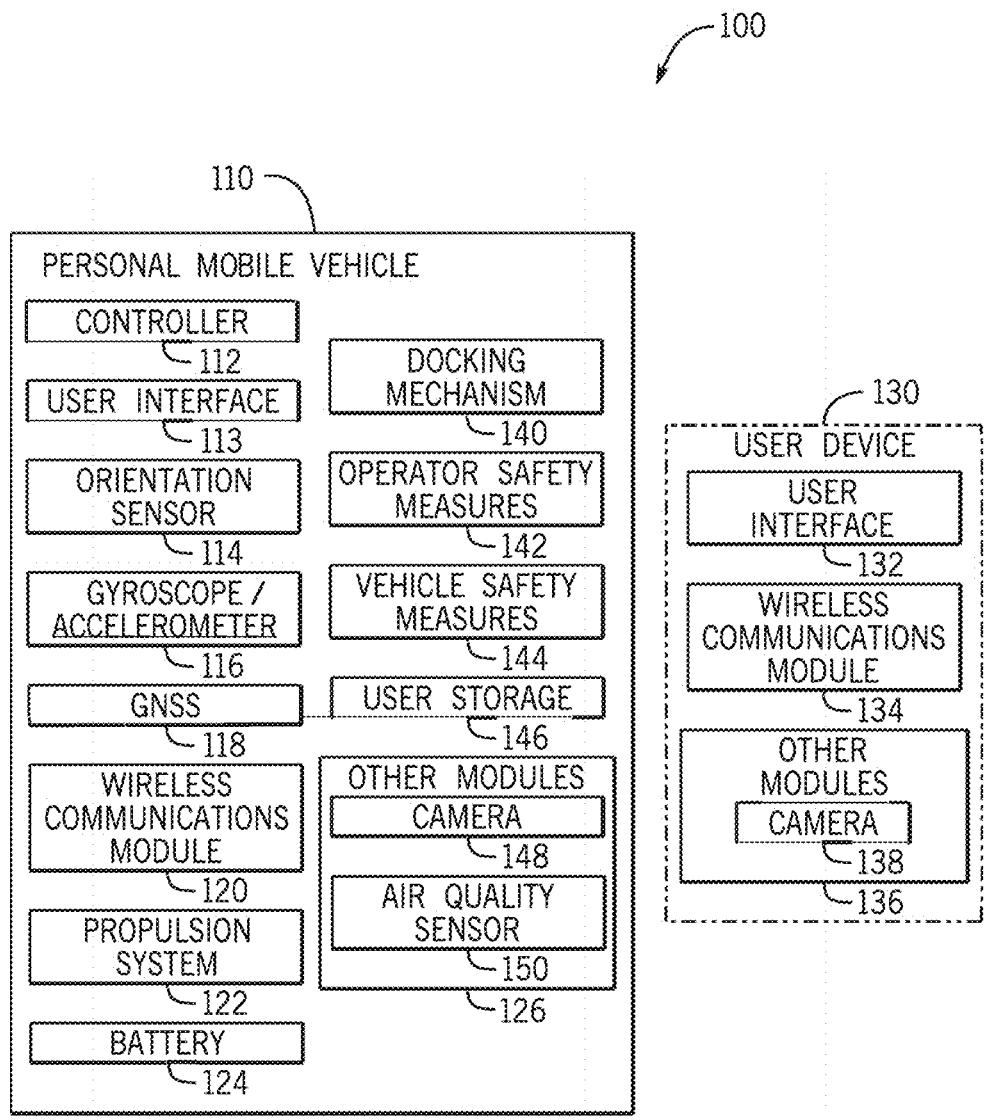
FIG. 1 illustrates a block diagram of a portion of a dynamic transportation matching system including a PMV in accordance with an embodiment of the disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

As used herein, the term "personal mobile vehicle (PMV)" refers to a vehicle that can be ridden by an individual rider. A PMV often has a light weight and has less protection for its rider as compared to an automobile. Example PMVs include a scooter, a bicycle, a scooter bike, and/or the like.

As used herein, the term "vulnerable road user (VRU)" refers to a user that has less protection and are at more risk in traffic. Example VRUs include pedestrians (people who are walking, running, jogging, hiking, sitting, standing, skating or skateboarding on the road), PMV riders, and/or the like.

As used herein, the term "road surface type of concern" refers to a type of road surface that may expose PMVs to a higher risk of accident as compared to a dry clean asphalt road surface. Example road surface types of concern may include a concrete sidewalk surface, a muddy surface, a pebble surface, a sandy surface, an icy surface, a wet surface, a slippery surface, and/or the like.

In view of the need to improve travel safety of PMVs, some systems may adopt a front and/or a back camera installed at the PMV to capture imagery of the environment external to the PMV such that a processor, either at the PMV or at a remote server, may determine whether the environment contains any road condition that may jeopardize the safety of the rider or public safety. For example, the processor may perform image detection on the capture imagery to identify whether a VRU is in proximity to the PMV, or the road condition may be hazardous, e.g., the PMV is traveling on a concrete sidewalk, road with water puddles, and/or the like. However, the use of camera captured imagery may pose several issues. On one hand, online detection of objects in the imagery captured in real time may cause significant computational overhead at the PMV. If the detection is off-loaded to a remote server, then the online detection of VRUs or road surface type heavily relies on network availability of the PMV, which may not be stable when the PMV is in motion. On the other hand, using a camera to constantly capture imagery of the environment external to the PMV may lead to a violation of privacy of pedestrians who may not consent to being captured in the imagery.

Commercial PMVs managed by a fleet management system are sometimes equipped with a radar sensor to detect objects in an environment external to the PMVs. Specifically, the PMV may be equipped with a variety of sensors, such as a radar, a sonar sensor, a (optional) camera, an inertia measurement unit (IMU), and/or the like. For example, the combination of a radar reflection signal and a sonar signal may provide measurements of characteristics such as a Doppler velocity and height information of a nearby object, which may be input to a machine learning classifier to determine the probability that the nearby object is a VRU. For another example, the reflection pattern from radar and ultrasonic may be used to input to a machine learning classifier to determine a type of the road surface, e.g., an asphalt road surface, a concrete sidewalk surface, a wet-grass lawn surface, and/or the like.

When the machine learning classifier determines that a VRU exists within a vicinity to the PMV, or the environment external to the PMV contains a road surface type of concern, e.g., when the PMV is traveling on a concrete sidewalk surface which may not be permitted by local regulation, an alert message may be generated for display. For example, the PMV may be equipped with a display panel, e.g., at the middle of the handle bar, which may be configured to display the alert message to the rider. For another example, the alert message may be sent to a user device, such as a Smartphone, and/or the like, which has been associated with the PMV at the time.

In some implementations, a control signal may be generated to apply a mobility parameter to the brake mechanism when the machine learning classifier determines that a VRU exists in vicinity to the PMV, or the environment external to the PMV contains a road surface type of concern. For example, the control signal may compel the PMV to comply with a speed limit or may trigger the brake mechanism to stop the PMV, e.g., to compel the rider to remove the PMV from a concrete sidewalk where local regulation does not permit PMVs on the sidewalk.

In some implementations, the PMV may be equipped with a global positioning system (GPS) component and/or a network component, such as Wi-Fi, Bluetooth, and/or the like. The fleet management server may receive information from PMVs relating to their respective locations and determined information on whether the respective location contains a VRU and the road surface type at the location. The fleet management server may share such information among PMVs that are clustered within a geographical range.

In this way, riders may be notified of various road conditions such as existence of VRUs in vicinity, dangerous road surface type, and/or the like. As road awareness is enhanced with the rider, travel safety with PMVs can be improved.

FIG. 1 illustrates a block diagram of a portion of a dynamic transportation matching system 100 (e.g., system 100) including a PMV 110 in accordance with an embodiment of the disclosure. In the embodiment shown in FIG. 1, system 100 includes PMV 110 and optionally a user device 130. In general, PMV 110 may be a passenger vehicle designed to transport a single person (e.g., a micro-mobility PMV, a transit bike and scooter vehicle, or the like) or a group of people (e.g., a typical car or truck). More specifically, PMV 110 may be implemented as a motorized or electric kick scooter, bicycle, and/or motor scooter designed to transport one or perhaps two people at once typically on a paved road (collectively, micro-mobility PMVs), as a typical automobile configured to transport up to 4, 7, or 10 people at once, or according to a variety of different transportation modalities (e.g., transportation mechanisms). PMVs similar to PMV 110 may be owned, managed, and/or serviced primarily by a fleet manager/servicer providing PMV 110 for rental and use by the public as one or more types of transportation modalities offered by a dynamic transportation matching system, for example. In some embodiments, PMVs similar to PMV 110 may be owned, managed, and/or serviced by a private owner using the dynamic transportation matching system to match their vehicle to a transportation request, such as with ridesharing or ride sourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of PMV 110.

As shown in FIG. 1, PMV 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of PMV 110 may be substantially manual, autonomous, and/or partially or completely controlled by user device 130, which may include one or more of a user interface 132, a wireless communications module 134, a camera 138, and other modules 136. In other embodiments, PMV 110 may include any one or more of the elements of user device 130. In some embodiments, one or more of the elements of system 100 may be implemented in a combined housing or structure that can be coupled to or within PMV 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of PMV 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of PMV 110, for example, or distributed as multiple logic devices within PMV 110 and/or user device 130.

In some embodiments, controller 112 may be configured to substantially continuously monitor and/or store the status of and/or sensor data provided by one or more elements of PMV 110 and/or user device 130, such as the position and/or orientation of PMV 110 and/or user device 130, for example, and the status of a communication link established between PMV 110 and/or user device 130. Such communication links may be established and then provide for transmission of data between elements of system 100 substantially continuously throughout operation of system 100, where such data includes various types of sensor data, control parameters, and/or other data.

User interface 113 of PMV 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of PMV 110 and/or other elements of system 100. For example, user interface 113 may be adapted to display a time series of positions, headings, and/or orientations of PMV 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause PMV 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of PMV 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of PMV 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of PMV 110 (e.g., or an element of PMV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to PMV 110 and to monitor the status of a communication link directly or indirectly established between PMV 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to PMV 110 and/or to steer PMV 110. In some embodiments, propulsion system 122 may include elements that can be controlled (e.g., by controller 112 and/or user interface 113) to provide motion for PMV 110 and to provide an orientation for PMV 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micro-mobility PMVs), PMV 110 may include battery 124. Battery 124 may be implemented by one or more battery cells (e.g., lithium ion battery cells) and be configured to provide electrical power to propulsion system 122 to propel PMV 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of PMV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of PMV 110 and/or system 100. In further embodiments, other modules 126 may include a light, such as a headlight or indicator light, and/or an audible alarm, both of which may be activated to alert passersby to possible theft, abandonment, and/or other critical statuses of PMV 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about PMV 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility PMV, as described herein.

PMVs implemented as micro-mobility PMVs may include a variety of additional features designed to facilitate fleet management and rider and environmental safety. For example, as shown in FIG. 1, PMV 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of PMV 110 and/or other elements of system 100. For example, user interface 132 may be adapted to display a time series of positions, headings, and/or orientations of PMV 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause PMV 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or PMV 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of PMV 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for PMV 110, using one or more power leads. Such power leads may also be used to support one or more communication techniques between elements of system 100.

Figure 2:
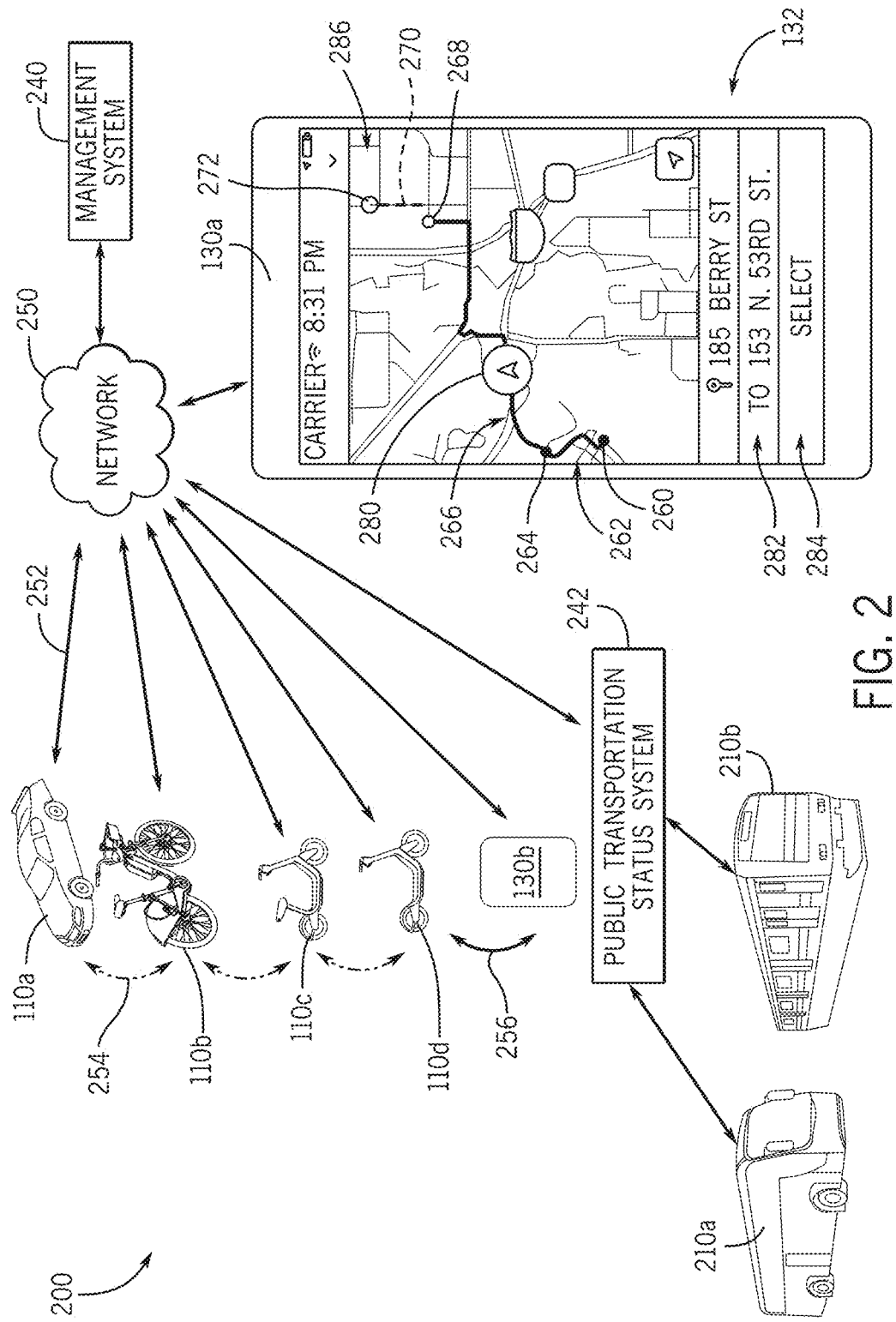
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of PMVs 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all PMVs are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more PMVs 110a-d and/or public transportation vehicles 210a-b. For example, the transportation request may be a request to use (e.g., hire or rent) one of PMVs 110a-d. The transportation request may be transmitted to management system 240 over WAN 250, allowing management system 240 to poll status of PMVs 110a-d and to select one of PMVs 110a-d to fulfill the transportation request. Upon or after one of the PMVs 110a-d is selected to fulfill the transportation request, a fulfillment notice from management system 240 and/or from the selected PMV 110a-d may be transmitted to the user device 130a. In some embodiments, navigation instructions to proceed to or otherwise meet with the selected PMV 110a-d may be sent to the user device 130a. A similar process may occur using user device 130b, but where the transportation request enables a PMV over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of PMVs 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among PMVs 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including PMVs and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of PMVs 210a or 210b), and a micro-mobility route 270 (e.g., using one or more of micro-mobility PMVs 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility PMV to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share PMV, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
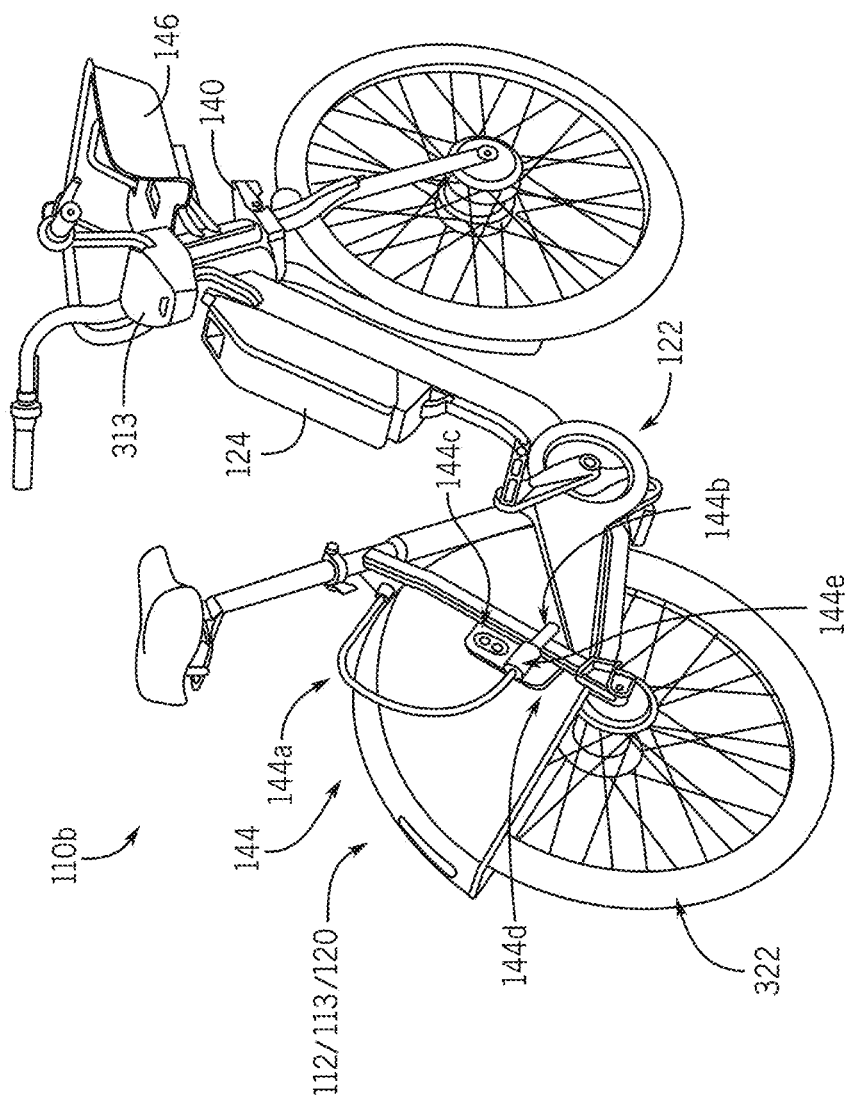
FIGS. 3A-3C illustrate respective diagrams of micro-mobility PMVs for use in a dynamic transportation matching system in accordance with an embodiment of the disclosure.
Figure 3B:
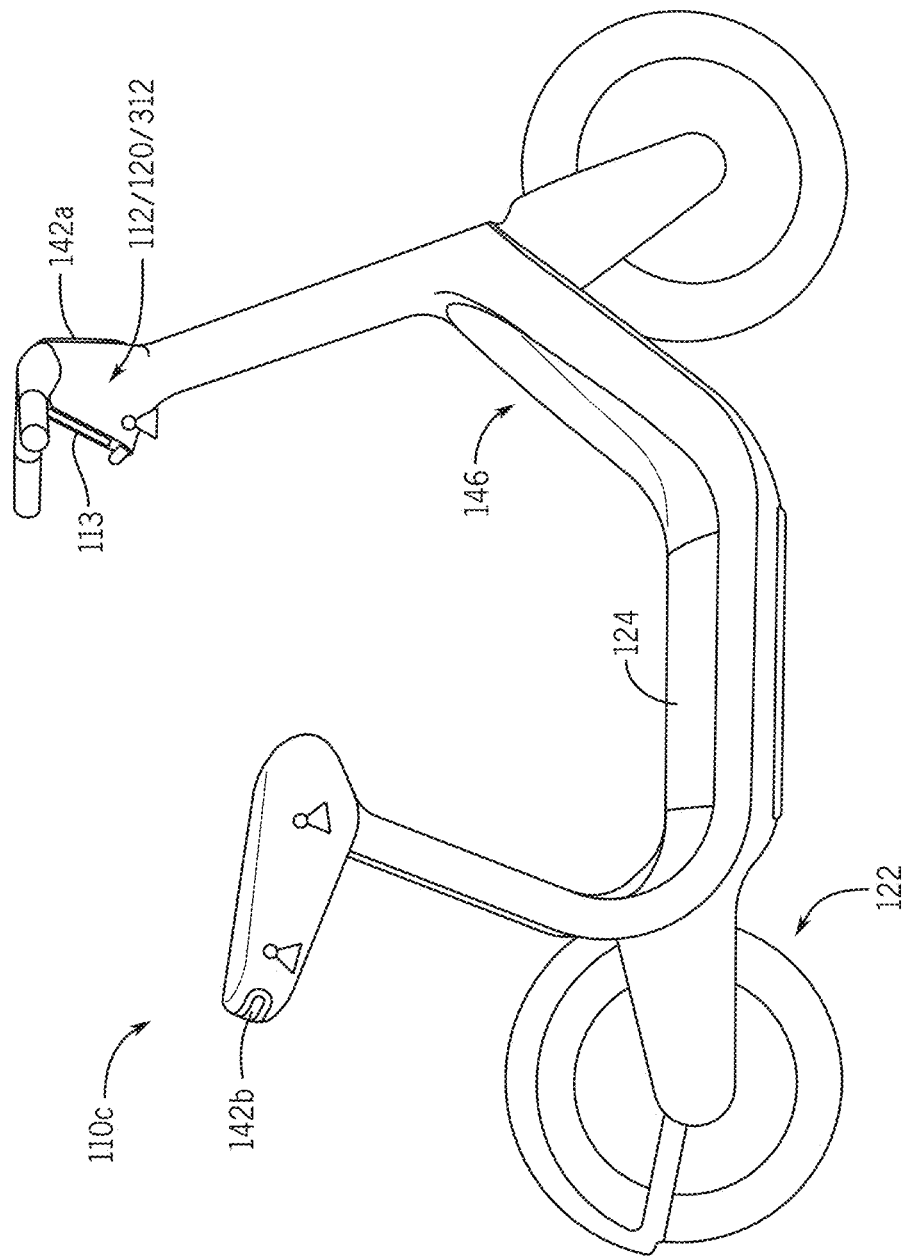
Figure 3C:
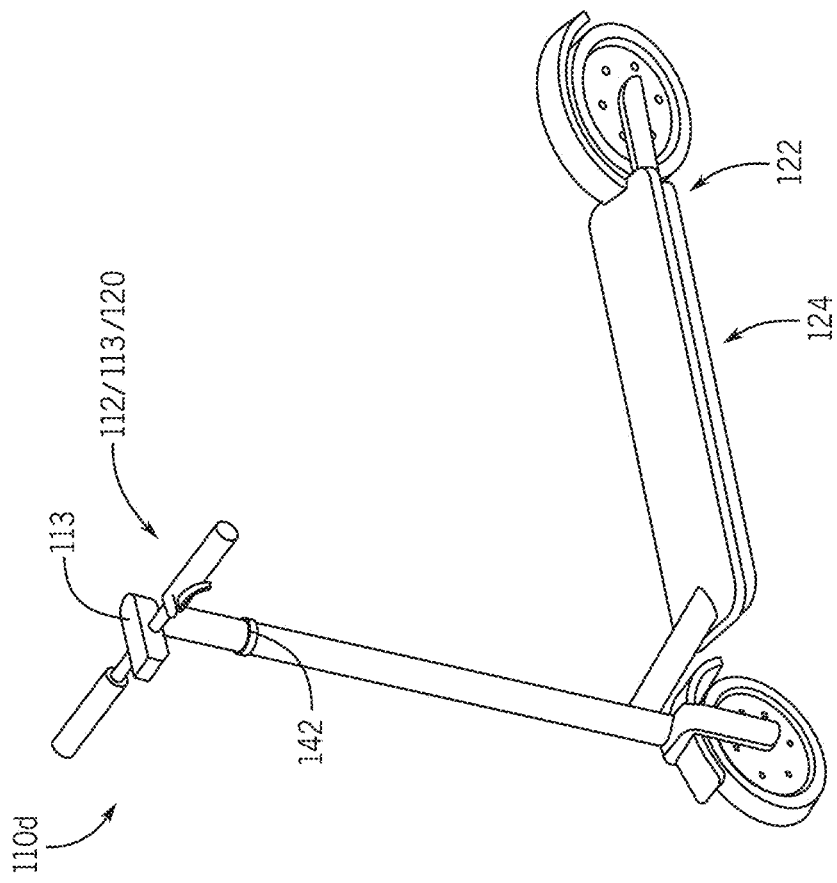

FIGS. 3A, 3B, and 3C illustrate respective diagrams of micro-mobility PMVs 110b, 110c, and 110d, which may be integrated network systems in accordance with an embodiment of the disclosure. For example, PMV 110b of FIG. 3A may correspond to a motorized bicycle integrated with the various elements of system 100 and may be configured to participate in dynamic transportation matching system 200 of FIG. 2. As shown, PMV 110b includes controller/user interface/wireless communications module 112/113/120 (e.g., integrated with a rear fender of PMV 110b), propulsion system 122 configured to provide motive power to at least one of the wheels (e.g., a rear wheel 322) of PMV 110b, battery 124 for powering propulsion system 122 and/or other elements of PMV 110b, docking mechanism 140 (e.g., a spade lock assembly) for docking PMV 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of PMV 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize PMV 110b by default, thereby requiring a transportation requester or rider to transmit a request to management system 240 (e.g., via user device 130) to reserve PMV 110b before attempting to use PMV 110b. The request may identify PMV 110b based on an identifier (e.g., a QR code, a barcode, a serial number, etc.) presented on PMV 110b (e.g., such as by user interface 113 on a rear fender of PMV 110b). Once the request is approved, management system 240 may transmit an unlock signal to PMV 110b (e.g., via network 250). Upon receiving the unlock signal, PMV 110b (e.g., controller 112 of PMV 110b) may release vehicle security device 144 and unlock rear wheel 322 of PMV 110b.

PMV 110c of FIG. 3B may correspond to a motorized sit-scooter integrated with the various elements of system 100 and may be configured to participate in dynamic transportation matching system 200 of FIG. 2. As shown in FIG. 3B, PMV 110c includes many of the same elements as those discussed with respect to PMV 110b of FIG. 3A. For example, PMV 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

PMV 110d of FIG. 3C may correspond to a motorized stand or kick scooter integrated with the various elements of system 100 and may be configured to participate in dynamic transportation matching system 200 of FIG. 2. As shown in FIG. 3C, PMV 110d includes many of the same elements as those discussed with respect to PMV 110b of FIG. 3A. For example, PMV 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
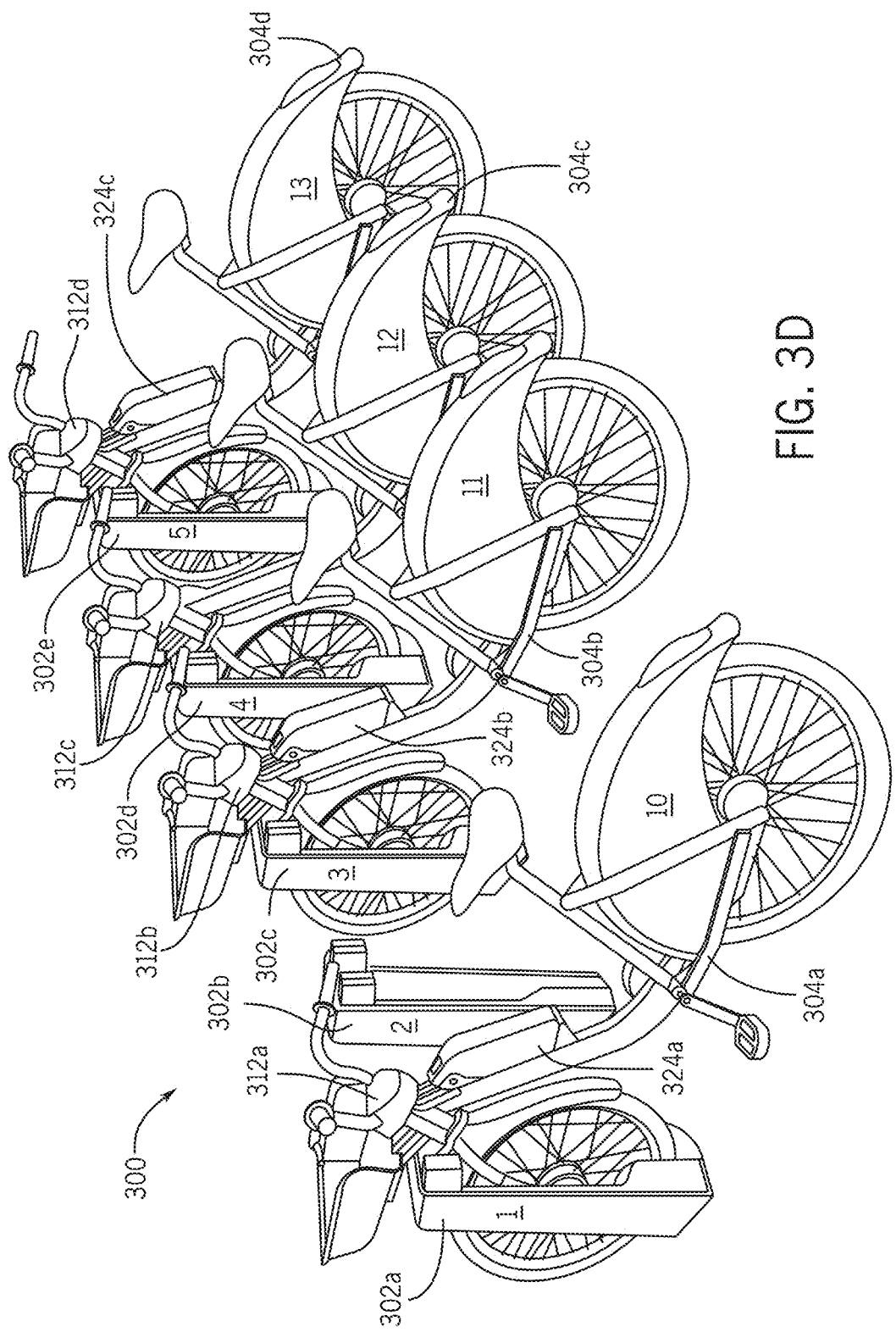
FIG. 3D illustrates a diagram of a docking station for docking one or more micro-mobility PMVs in accordance with an embodiment of the disclosure.

FIG. 3D illustrates a docking station 300 for docking PMVs (e.g., PMVs 110c, 110e, and 110g, etc.) according to one embodiment. As shown, docking station 300 may include multiple bicycle docks, such as docks 302a-e. In this example, a single PMV (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a PMV is docked in a bicycle dock, the dock may be electronically coupled to the PMV (e.g., controllers 312a-d of the PMV) via a link such that the PMV and the dock may communicate with each other via the link.

A transportation requester or rider may use a user device (e.g., user device 130) to use a micro-mobility PMV 110b-d that is docked in one of the bicycle docks 302a-e by transmitting a request to management system 240. Once the request is processed, management system 240 may transmit an unlock signal to a micro-mobility PMV 110b-d docked in the dock and/or the dock via network 250. The docking station 300 may automatically unlock the lock mechanism to release the micro-mobility PMV 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of PMVs docked at the docking station 300, charge statuses of the docked PMVs, etc.) to the management system 240.

Figure 4:
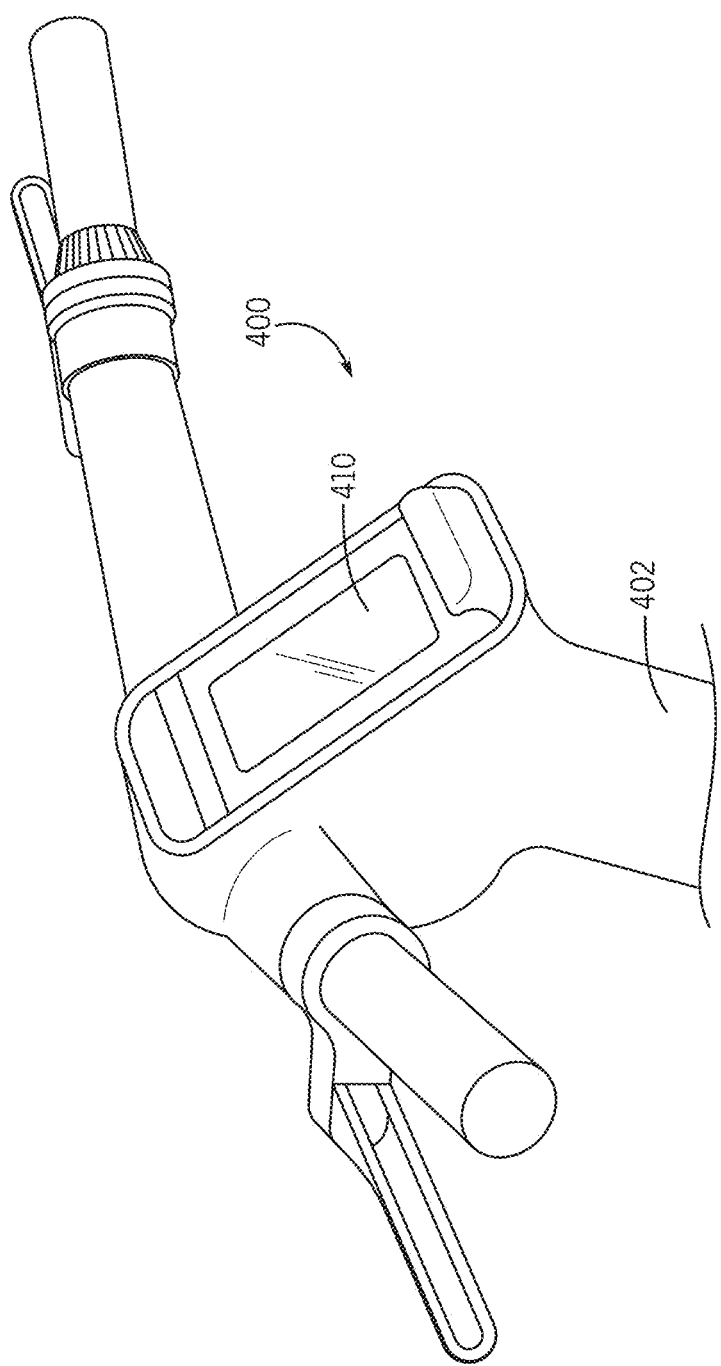
FIG. 4 illustrates a diagram of a user interface associated with a micro-mobility PMV in accordance with an embodiment of the disclosure.

FIG. 4 illustrates a diagram of a user interface 400 associated with a micro-mobility PMV 402 in accordance with an embodiment of the disclosure. The micro-mobility PMV 402 may be similar to any one of PMVs 110b, 110c, or 110*d*, described above. The user interface 400 may be integrated with the micro-mobility PMV 402, such as integrated with at least a portion of a cockpit of the micro-mobility PMV 402. In some embodiments, the user interface 400 may form at least a portion of an outer housing of the handlebar of the micro-mobility PMV 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micro-mobility PMV 402 may be rendered on the display 410. Information related to the operation of the micro-mobility PMV 402, such as time information, map information, navigation information, instructions for operation, operational warnings or notifications, among others, may be rendered on the display 410. For example, one or more notifications may be rendered on the display 410 instructing or reminding the rider to properly lock and/or park the micro-mobility PMV 402. In some embodiments, the user interface 400 may present information similar to that described in U.S. patent application Ser. No. 16/578,995, entitled "Micro-mobility Electric Vehicle with Electronic Device Holder and Integrated Display," which is incorporated herein in its entirety for all purposes.

Figure 5A:
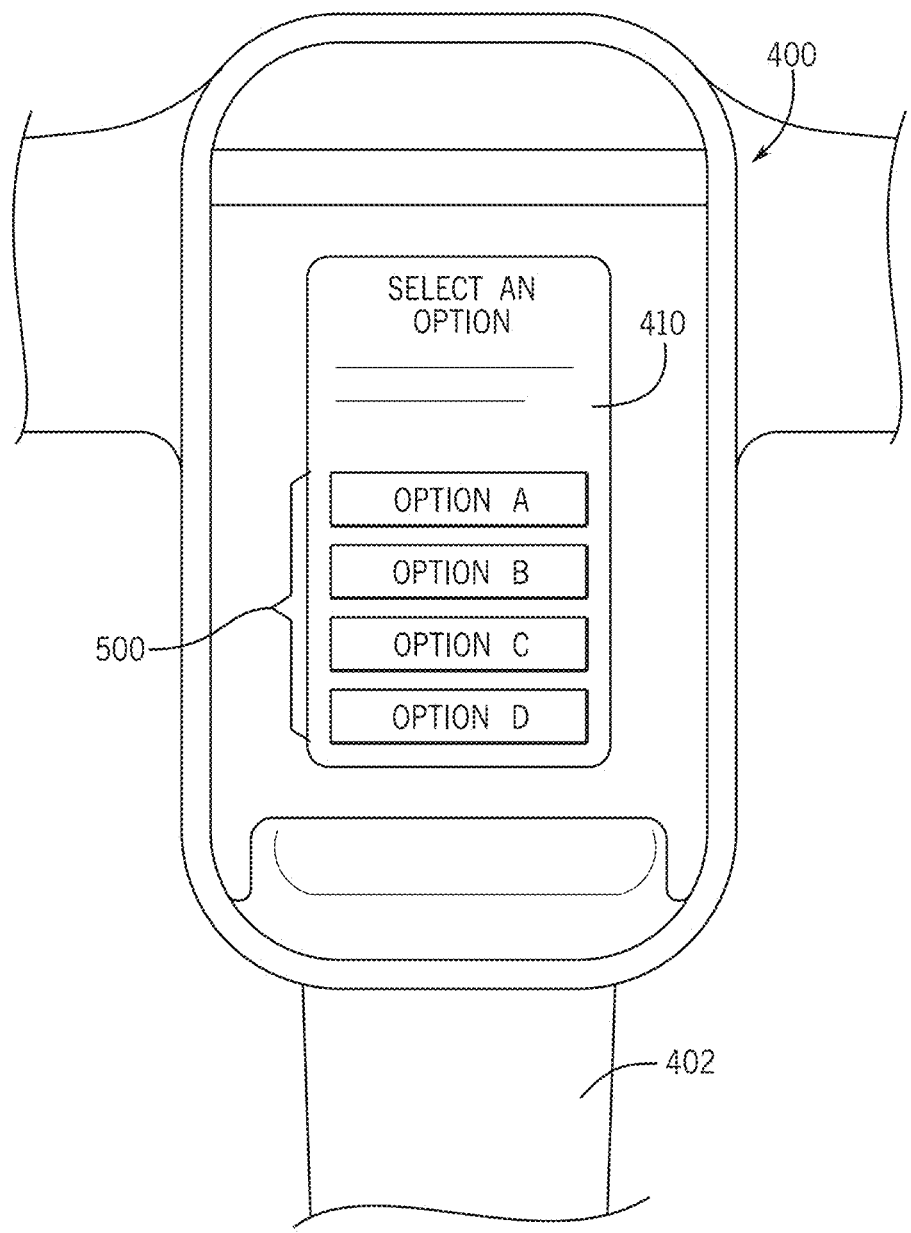
FIGS. 5A-5C illustrate respective diagrams of various examples of information rendered on a display of the user interface of FIG. 4 in accordance with an embodiment of the disclosure.
Figure 5B:
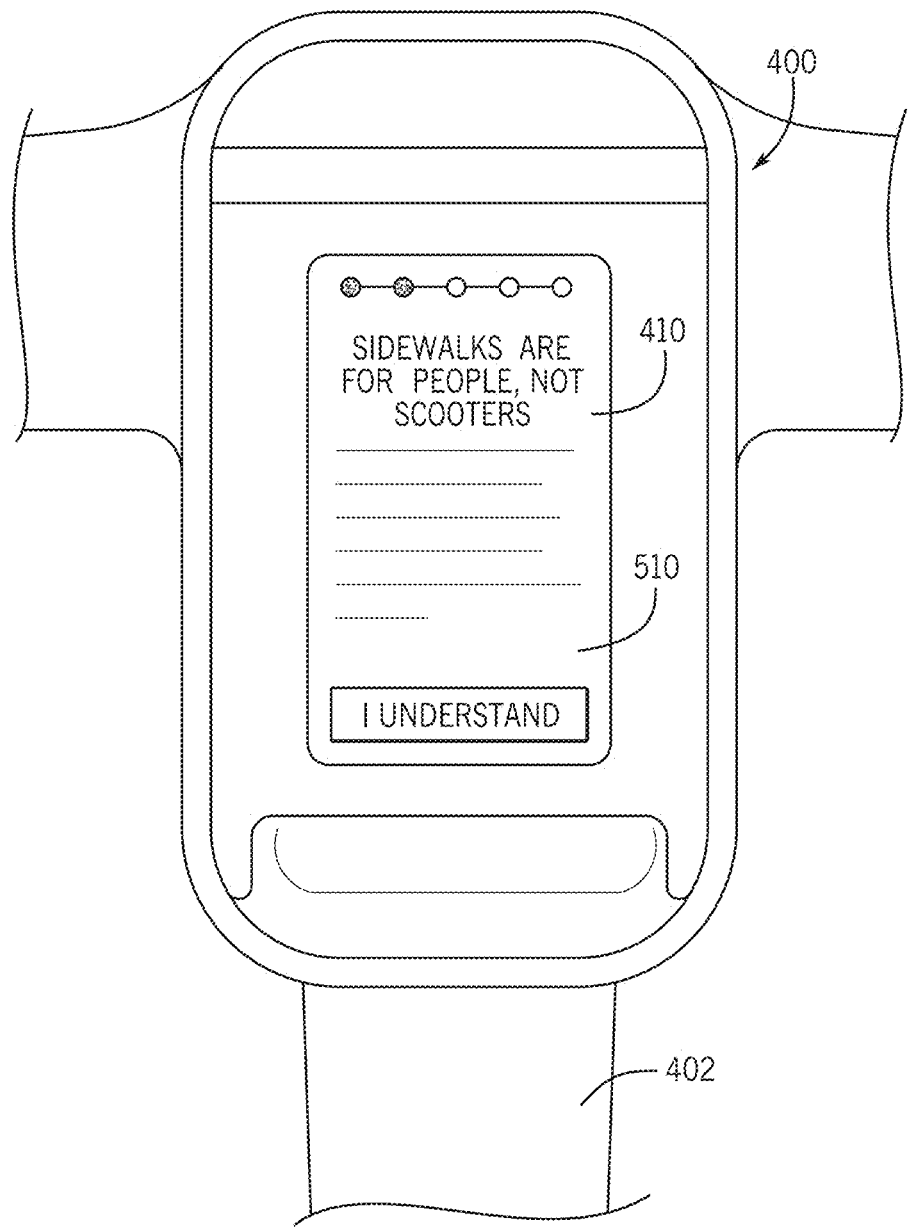
Figure 5C:
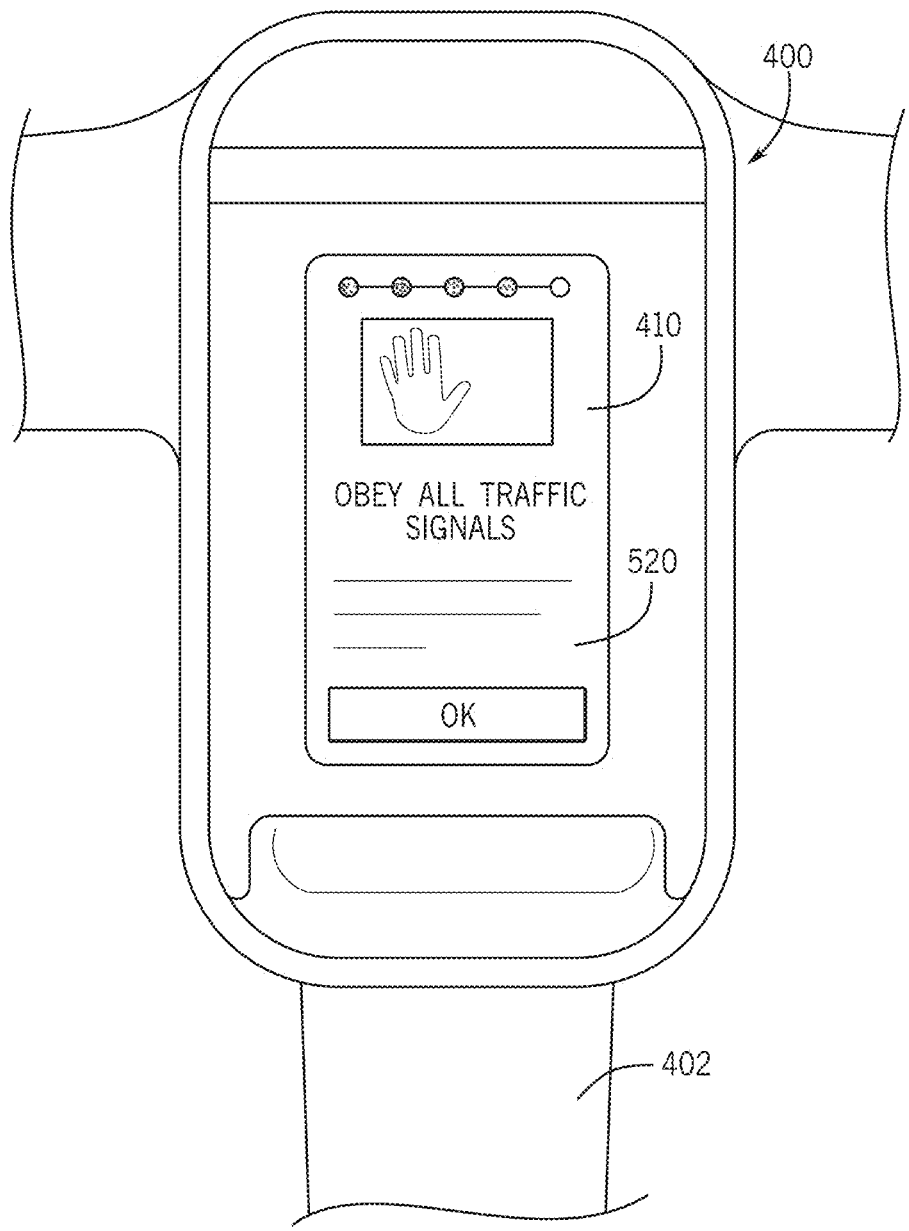

FIGS. 5A, 5B, and 5C illustrate respective diagrams of various examples of information rendered on the display 410 of the user interface 400 in accordance with an embodiment of the disclosure. The display 410 may render various information and different times, such as during operation of the micro-mobility PMV 402, which includes starting, during, or ending a trip or prior to starting use or after ending a ride of the micro-mobility PMV 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micro-mobility PMV 402 from a docking station, pair the micro-mobility PMV 402 to a docking station, request service or maintenance of the micro-mobility PMV 402, report issues with the micro-mobility PMV 402, and the like. In some embodiments, the options 500 rendered on the display 410 may allow the rider to turn on a headlight assembly, turn off the headlight assembly, or otherwise control operation of one or more systems of the micro-mobility PMV 402.

Referring to FIG. 5B, the display 410 may render one or more notifications 510 related to operation of the micro-mobility PMV 402. For instance, the display 410 may render use agreements, local rules and regulations (such as prohibition PMVs on sidewalks), liability waivers, operation instructions, operation reminders, and the like for acknowledgment by the rider before, during, or after use. Referring to FIG. 5C, the display 410 may render one or more notifications 520 based on a detected condition of the micro-mobility PMV 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micro-mobility PMV 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micro-mobility PMV 402 is detected as being stationary or stopped.

Figure 6:
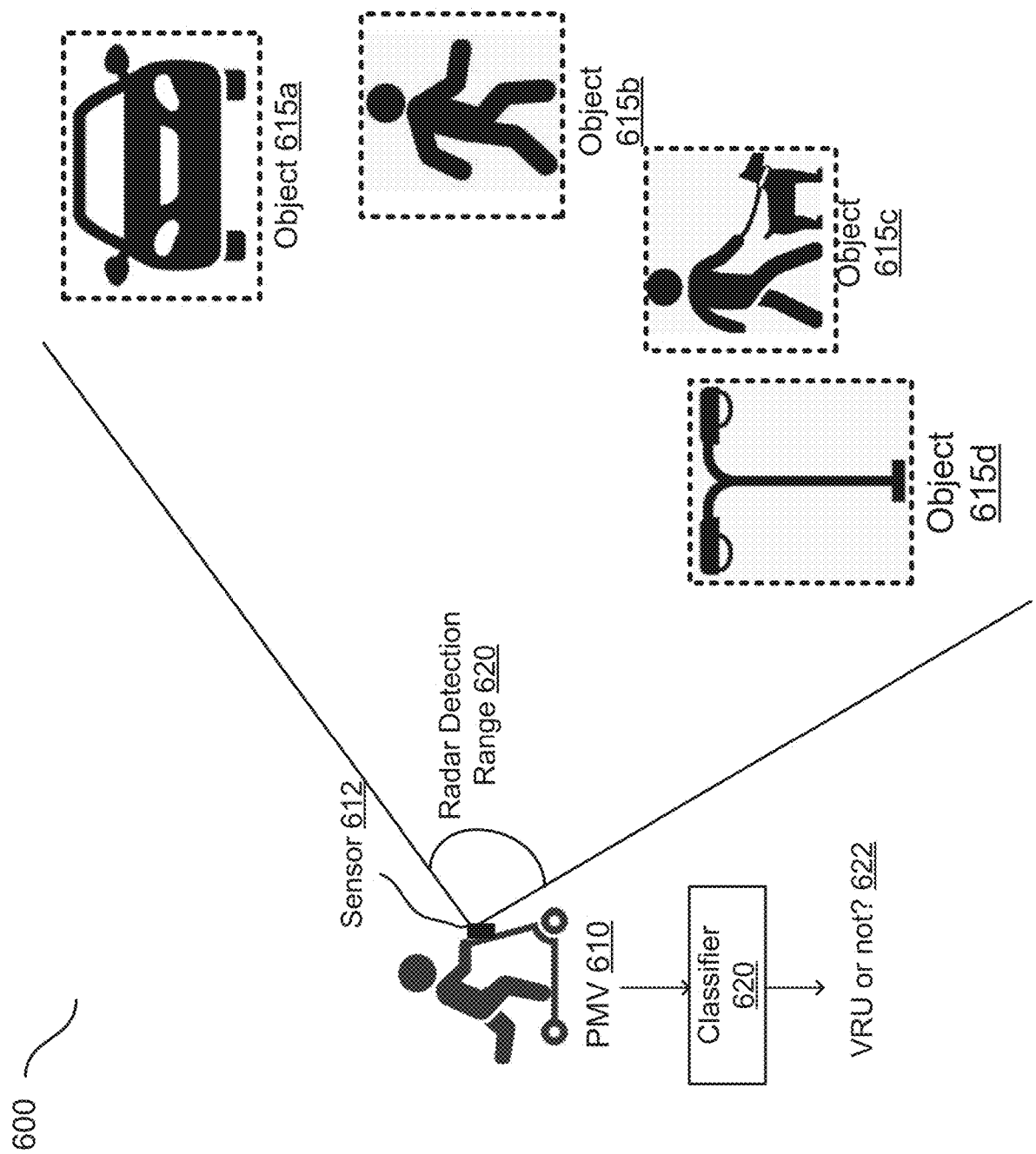
FIG. 6 provides an example block diagram illustrating a PMV detecting a vulnerable road user (VRU) in the road, according to embodiments described herein.

FIG. 6 provides an example block diagram 600 illustrating a PMV detecting a vulnerable road user (VRU) in the road, according to embodiments described herein. Diagram 600 shows a PMV 610 being ridden by a rider. The frame of the PMV 610 is equipped with a sensor 612, which may include any combination of a radar sensor, a sonar sensor, a camera, and an inertia measurement unit (IMU). The sensor 612, for example, a radar sensor, may scout an environment external to the PMV, by emitting an electromagnetic wave signal towards an environment external to the PMV, and receiving a reflection pattern indicating a characteristic of an object in the environment external to the PMV 610 within the radar detection range 620.

For example, within the range of radar detection 620, there may be a variety of objects 615*a-d*. The radar signal may capture characteristics of each object 615*a-d*, such as the Doppler velocity, height information, width information, and/or the like. The characteristics contained in the radar signal may then be input to a machine learning classifier 620, which may in turn generate the likelihood for each object 615*a-d* that the respective object may be a VRU.

For example, the range of radar detection 620 may include a detection range of 15 meters, and an angular resolution of 1-2 degrees. The Doppler accuracy of the sensor 612 may be 2 m/s. In this example, object 615*a* may have a height, a width and a general shape that is unlikely to be a VRU. Object 615*d* may have a height that is unlikely to be a VRU. Objects 615*a-c* may have heights and Doppler velocity that may likely belong to VRUs. The determination 622 on whether the radar detection rage 620 contains a VRU may be sent for display, e.g., at display 410 shown in FIG. 4.

Figure 7:
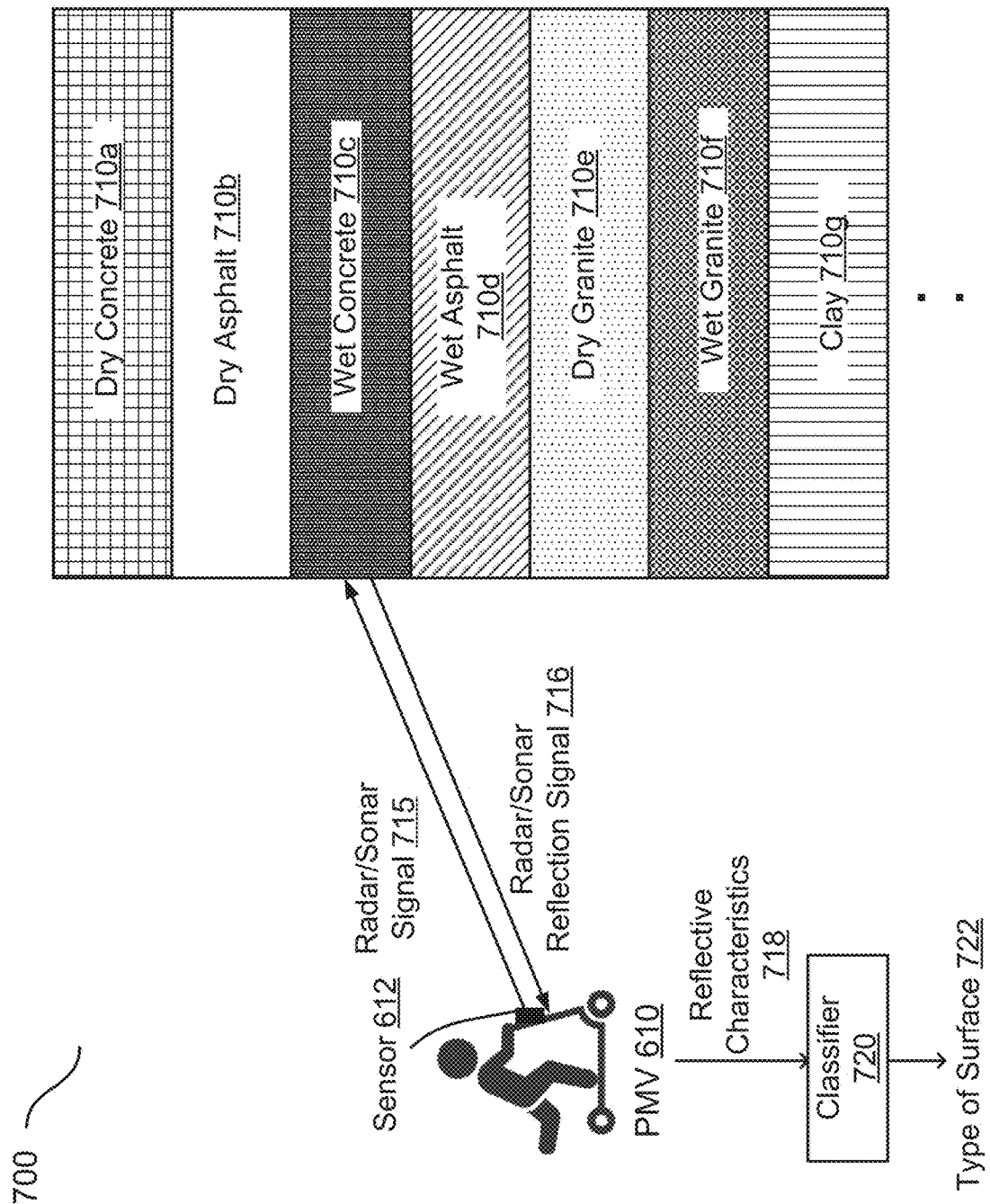
FIG. 7 provides an example block diagram illustrating a PMV determining a type of the road surface, according to embodiments described herein.

FIG. 7 provides an example block diagram 700 illustrating a PMV determining a type of the road surface, according to embodiments described herein. Diagram 700 shows the PMV 610 being ridden by a rider as shown in FIG. 6. The PMV 610 is equipped with the same sensor or set of sensors 612 as that shown in FIG. 6. Specifically, the sensor 612 may include a combination of a radar sensor and a sonar sensor (ultra-sonics), which are configured to emit a radar or ultrasonic signal 715 towards an environment external to the PMV, and receive a reflection signal 716 of a reflection pattern indicating a characteristic of the road surface in the environment external to the PMV 610. In this way, the same sensor or the same set of sensors 612 equipped at the PMV 610 may be used to detect both the existence of VRU and the road surface type of the environment.

In some embodiments, the PMV 610 may include various sensors mounted at various orientations and in various parts of the frame of the PMV 610 to provide different levels of sensitivity and/or coverage. For example, the radar and sonar sensors may be mounted at one end of the frame of the PMV 610, e.g., as shown at 612, to emit signals towards the environment (including the road surface) in front of the PMV 610. For another example, a radar sensor may be mounted at the back of the PMV 610 such that the radar sensor may emit signals towards the environment behind the PMV 610 to detect VRUs that the rider may not see. For another example, a video camera may be mounted facing downward to just capture imagery of the ground such that the imagery may be used to determine the road surface type, but with minimum effect of violating the privacy of the surrounding.

Example road surfaces may include a dry concrete (sidewalk) surface 710a, a dry asphalt (road) surface 710b, a wet concrete surface 710c, a wet asphalt surface 710d, a dry granite surface 710e, a wet granite surface 710f, a clay surface 710g, and/or the like. Other example road surfaces may include a mud surface, a soil surface, a foliage surface, a lawn surface, an ice (e.g., frozen puddle in the street, frozen lake/rivers, etc.) surface, a water (puddle) surface, a sand (e.g., on the beach, etc.) surface, a wood (e.g., a bridge, or indoor setting) surface, a pebble surface, a glass (e.g., a bridge, or indoor setting) surface, a plastic (e.g., playground facility, etc.) surface, a rubber (e.g., playground facility, etc.) surface, and/or the like.

For example, different materials may reflect the radar or ultrasonic signal 715 with different characteristics, such as signal attenuation, dielectric constant, velocity, and/or the like. Table 1 shows example reflective characteristics of different materials.

TABLE 1

Example Reflection Pattern Characteristics of Materials

| Material | Attenuation (dB/m) | Dielectric Constant | Velocity (m/ns) |
| --- | --- | --- | --- |
| Air | 0 | 1 | 0.30 |
| Water | 0.1 | 81 | 0.03 |
| Dry Asphalt | 2-15 | 2-4 | 0.15-0.21 |
| Wet Asphalt | 2-20 | 6-12 | 0.09-0.12 |
| Clay | 10-100 | 2-20 | 0.05-0.21 |
| Dry Concrete | 2-12 | 4-10 | 0.010-0.15 |
| Wet Concrete | 10-25 | 10-20 | 0.07-0.09 |
| Dry Granite | 0.5-3 | 5 | 0.13 |
| Wet Granite | 2-5 | 7 | 0.11 |

A processing unit on the PMV 610 may then analyze the reflection signal 716 to obtain reflection pattern characteristics 718, which is input to the classifier 720 to generate a classification distribution of the type of road surface 722.

In one embodiment, if the PMV determines that there is a high chance the road surface type is of concern, e.g., wet concrete, wet asphalt, granite, and/or the like, the determined surface type 722 may be included in an alert message to be sent for display, e.g., at display 410 shown in FIG. 4.

Figure 8A:
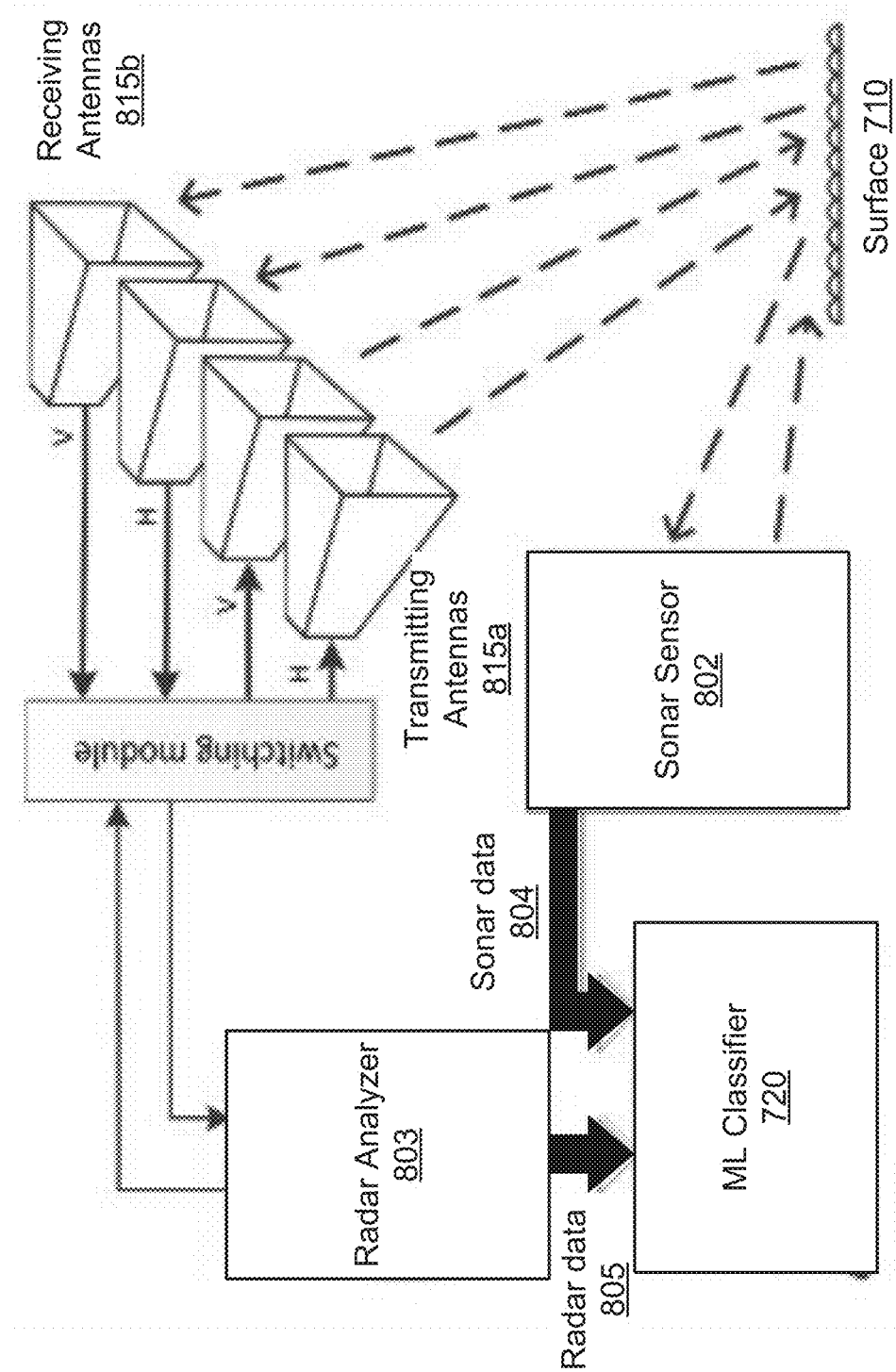
FIGS. 8A-8C provide example diagrams illustrating determining a type of the road surface based on a radar and/or sonic reflective pattern from the road surface, according to embodiments described herein.
Figure 8B:
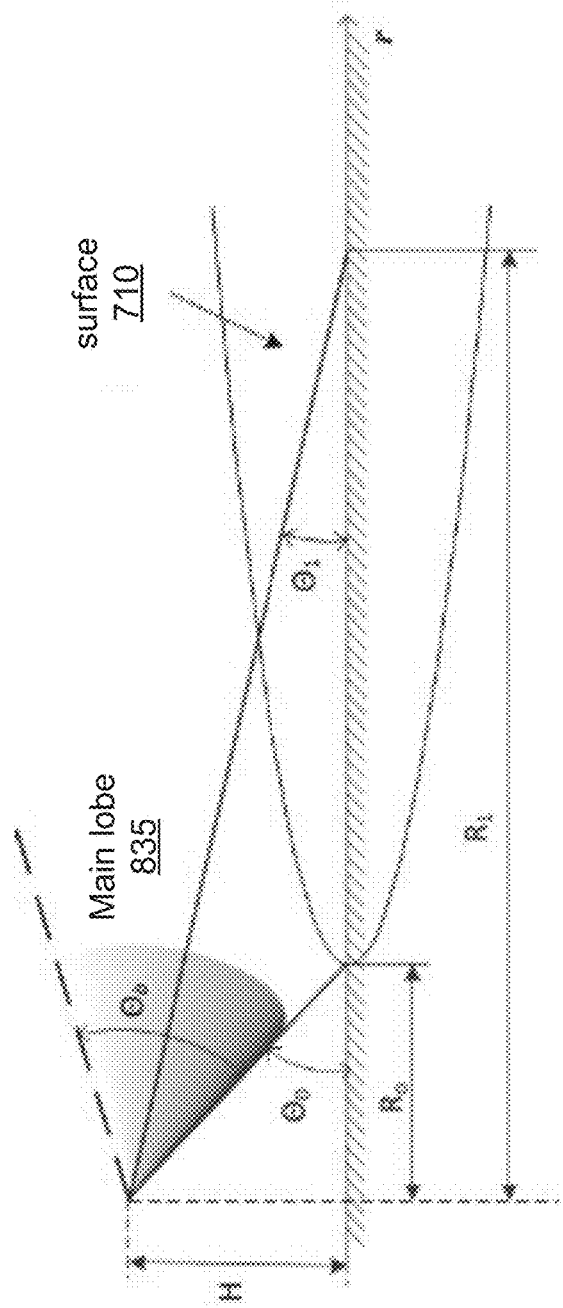
Figure 8C:
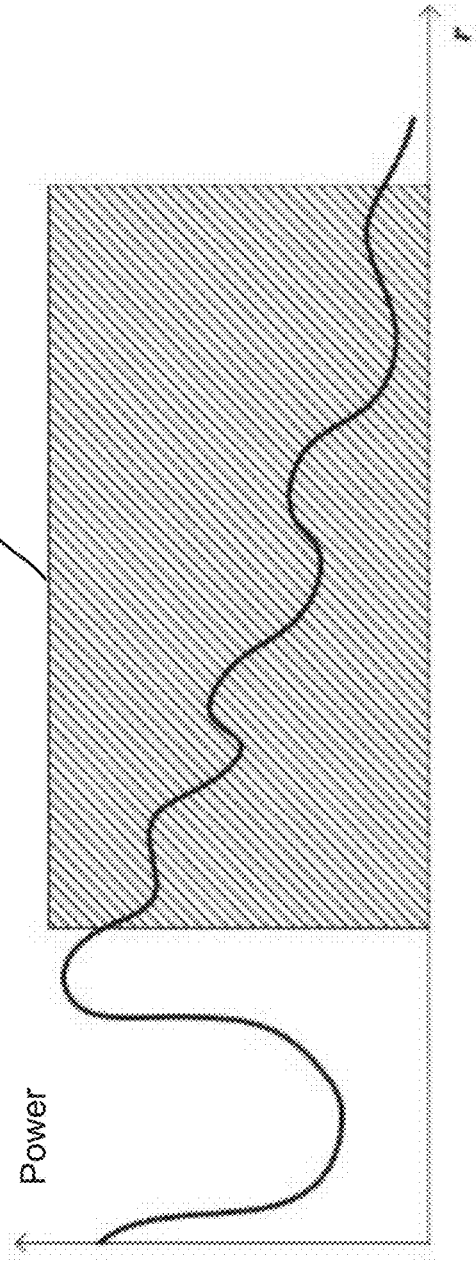

FIGS. 8A-8C provide example diagrams illustrating determining a type of the road surface based on a radar and/or sonic reflective pattern from the road surface, according to embodiments described herein. In FIG. 8A, radar transmitting antennas 815a and/or a sonar sensor 802 may emit an electromagnetic wave signal, or an ultrasonic signal, respectively, to the surface 710. The surface 710 may be in vicinity of the PMV in the environment external to the PMV.

The surface 710 may in turn reflect the radar electromagnetic wave signal, or an ultrasonic signal, which may be captured by the radar receiving antennas 815b and the sonar sensor 802, respectively. For example, as shown in FIG. 8B, the main lobe 835 of the reflected signal from the surface 710 may be captured. Specifically, the mounting angle of the radar sensor antennas may affect the reflection pattern detected and may help to determine different types of the road surfaces. The backscattered signal 840, which includes the reflection of waves or signals back to the direction from which they came, is usually a diffuse reflection due to scattering. Thus, as shown in FIG. 8C, the power of the backscattered signal 840 may be used as a signature of the surface 710.

Referring back to FIG. 8A, a radar analyzer 803 may then analyze the reflected radar signal and send radar data 805 to the machine learning classifier 720. The sonar sensor 802 may also send sonar data 804 to the machine learning classifier 720. For example, the radar data 805 and the sonar data 804 may be combined as an input vector for the machine learning classifier 720, which may in turn generate a classification distribution representing the probabilities that the surface 710 may belong to a specific road surface type, e.g., P (surface=wet asphalt)=0.3, P (surface=wet concrete)=0.05, etc.

Figure 9A:
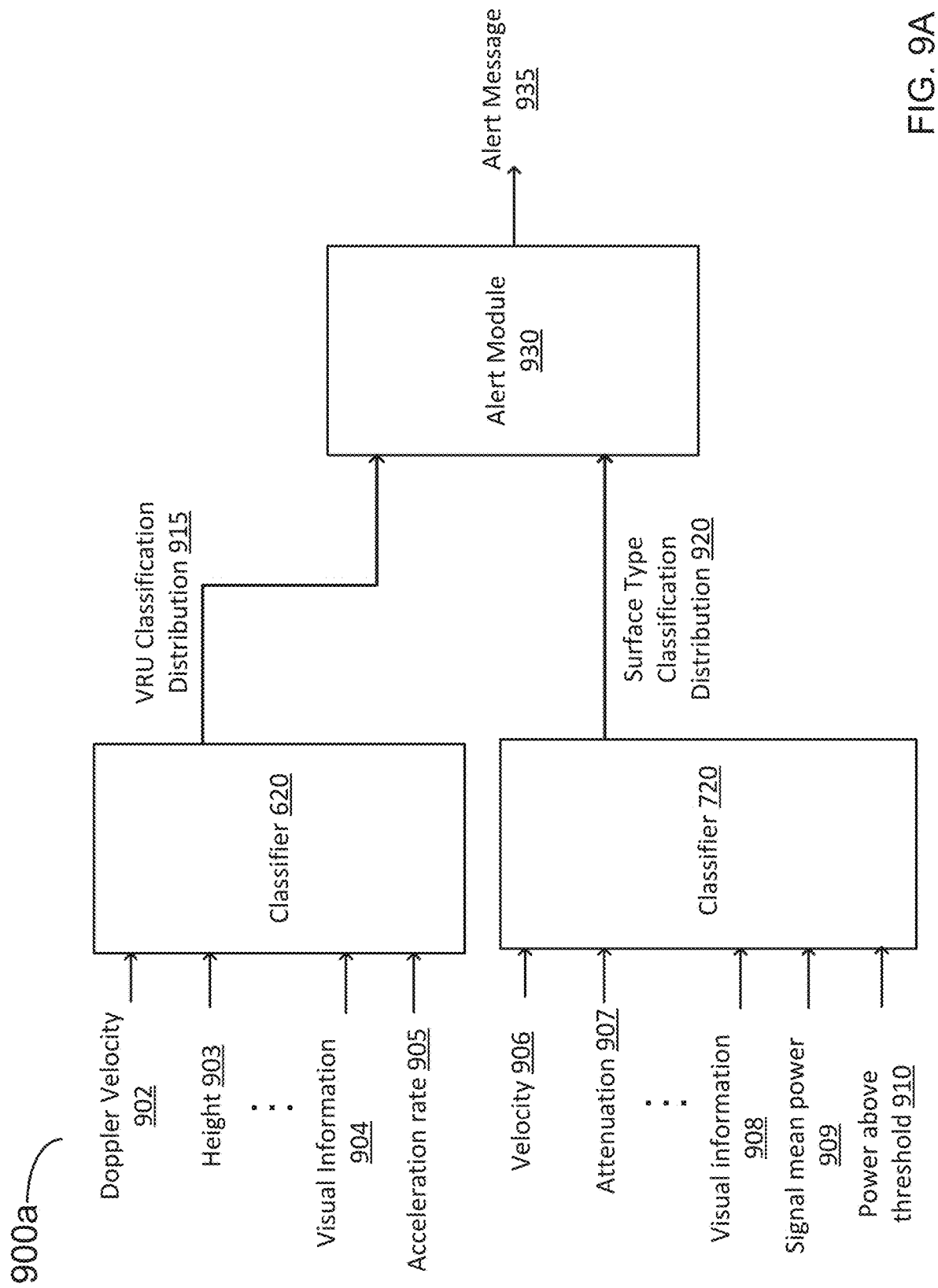
FIGS. 9A-9B provide an example block diagram illustrating an example work flow of combining various different data signals for a machine learning classifier to generate a VRU or surface type classification, based on which an alert message or a mobility parameter adjustment is generated, according to embodiments described herein.
Figure 9B:
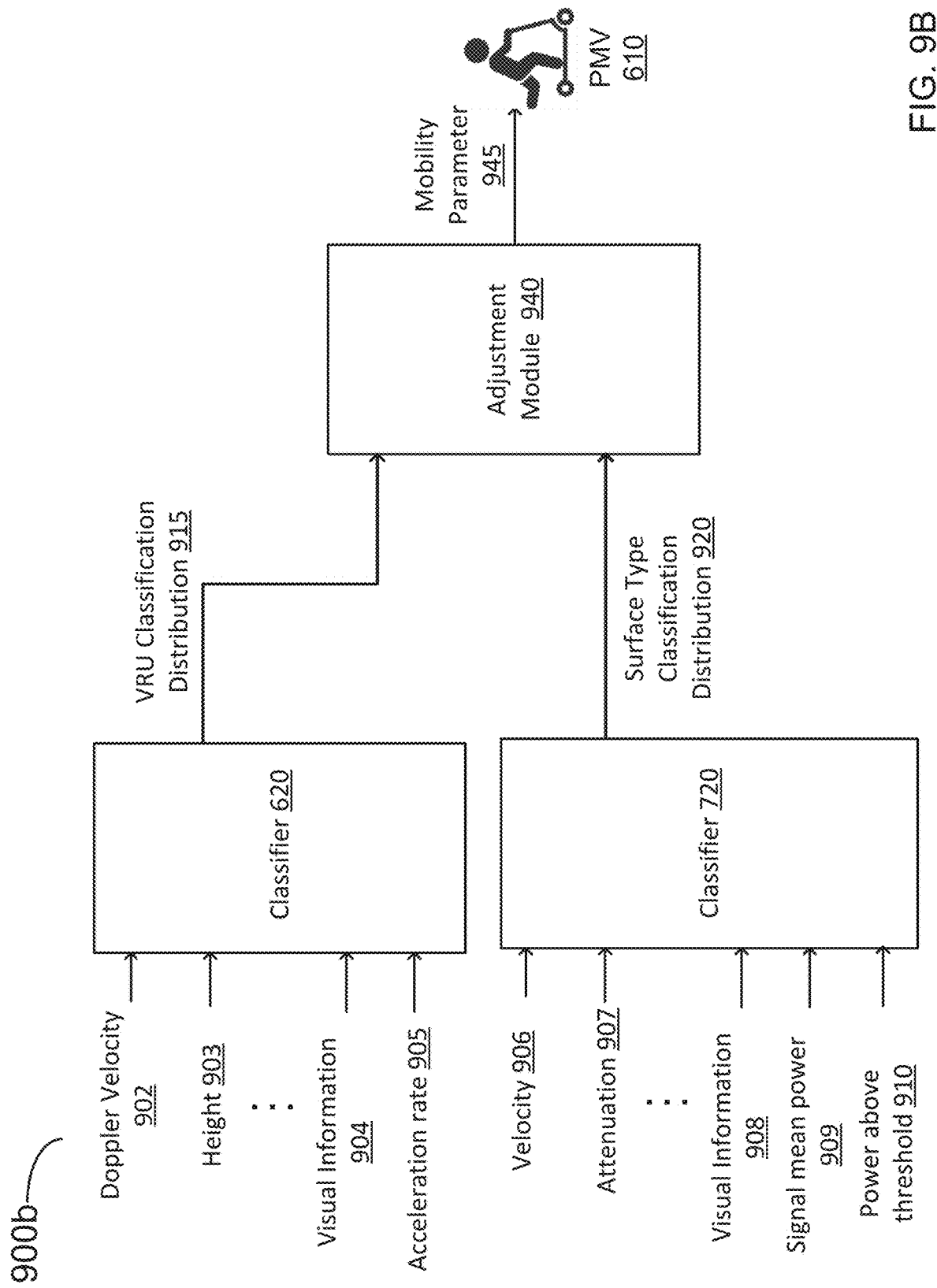

FIGS. 9A-9B provide example block diagrams 900a and 900b illustrating example work flows of combining various different data signals for a machine learning classifier to generate a VRU or surface type classification, based on which an alert message or a mobility parameter adjustment is generated, according to embodiments described herein. In FIG. 9A, diagram 900a shows that a first machine learning classifier 620 may receive a combination of data inputs such as, but not limited to Doppler velocity 902 of an object, height information 903 of an object, (optional) visual information 904, acceleration rate 905 (captured by IMU), and/or the like. The various data factors 902-905 may be combined as an input vector for the machine learning classifier 620, which may generate a VRU classification distribution 915 indicating the likelihood that the object is a VRU.

The machine learning classifier 620 may comprise a convolutional neural network (CNN), and may be trained by training data comprising data factors 902-905. Each combination of data factors 902-905 is annotated with a corresponding ground-truth label of whether an object is a VRU. Thus, the machine learning classifier 620 may generate a classification of the training data factors 902-905, e.g., a predicted probability that a detected object is a VRU, to be compared with the ground-truth label to compute a training objective, e.g., using cross-entropy. The machine learning classifier 620 may then be updated based on the training objective via backpropagation.

On the other hand, diagram 900a shows that a second machine learning classifier 720 may receive a combination of data inputs such as, but not limited to velocity 906, attenuation 907, (optional) visual information 908, signal mean power 909 of the reflected signal, power above threshold 910, and/or the like. Specifically, the visual information 908 may be captured by a camera carried by the PMV. The camera may be configured to face down to only capture a view of the ground that the PMV is situation on, so as to minimize the effect of privacy violation of the surrounding. The visual information 908 may include a region of interest from the original captured image and may then be encoded into a feature representation by the machine learning classifier 720.

The various data factors 906-910 may be combined as an input vector for the machine learning classifier 720, which may generate a road surface type classification distribution 920 indicating the likelihoods that road surface belongs to a particular road surface type.

The machine learning classifier 720 may comprise a convolutional neural network (CNN), and may be trained by training data comprising data factors 906-910. Each combination of data factors 906-910 is annotated with a corresponding ground-truth label of a specific surface type. Thus, the machine learning classifier 720 may generate a classification of the training data factors 906-910, to be compared with the ground-truth label to compute a training objective, e.g., using cross-entropy. The machine learning classifier 720 may then be updated based on the training objective via backpropagation.

The generated VRU classification distribution 915 and the surface type classification distribution 920 are then sent to an alert module 930, which may generate an alert message 935. For example, the alert message 935 may include an alert of the existence of the VRU in vicinity of the PMV, and/or a surface type. For another example, the alert message 935 may include a recommended speed limit in view of the detected VRUs and/or a road surface type of concern. Specifically, the recommended speed limit may be determined based on the actual road surface type of concern. For example, a recommended speed limit associated with the surface type "wet concrete" may be lower than that associated with the surface type "wet asphalt."

In one embodiment, the alert module 930 may be implemented at the PMV. In another embodiment, the alert module 930 may be implemented at a remote server. For example, the PMV may send the classification distributions 915 and 920 to a remote server, which may in turn generate alert messages and/or a recommended speed limit for the PMV.

In one embodiment, the use of a CNN in the machine learning classifiers 620 and 720 may achieve better than 99% accuracy in classifying the VRUs and/or road surface types of the environment. Such accuracy significantly improves public safety and the reliability of commercial PMVs.

In FIG. 9B, diagram 900*b* shows that instead of the alert module 920 for generating an alert message 935, an adjustment module 940 may receive the classification distributions 915 and 920. The adjustment module 940 may generate a mobility parameter 945 based on the classification results 915 and 920. For example, in cities where local regulations ban PMVs on sidewalks, if the surface type classification distribution 920 indicates the road surface is likely "concrete," the adjustment module 940 may generate a mobility parameter 945 to apply to the brake mechanism of the PMV 610 to compel the PMV 610 to cease motion. For another example, the mobility parameter 945 may include a control parameter based on the recommended speed limit described above in relation to FIG. 9A. The mobility parameter 945 may be applied to the wheel control mechanism on the PMV 610 to automatically limit the speed of the PMV 610 under the recommended speed limit.

In one embodiment, the adjustment module 940 may be implemented at the PMV. In another embodiment, the adjustment module 9*r*0 may be implemented at a remote server. For example, the PMV may send the classification distributions 915 and 920 to a remote server, which may in turn generate and send a control signal including the mobility parameter 945 to the PMV 610.

Figure 10A:
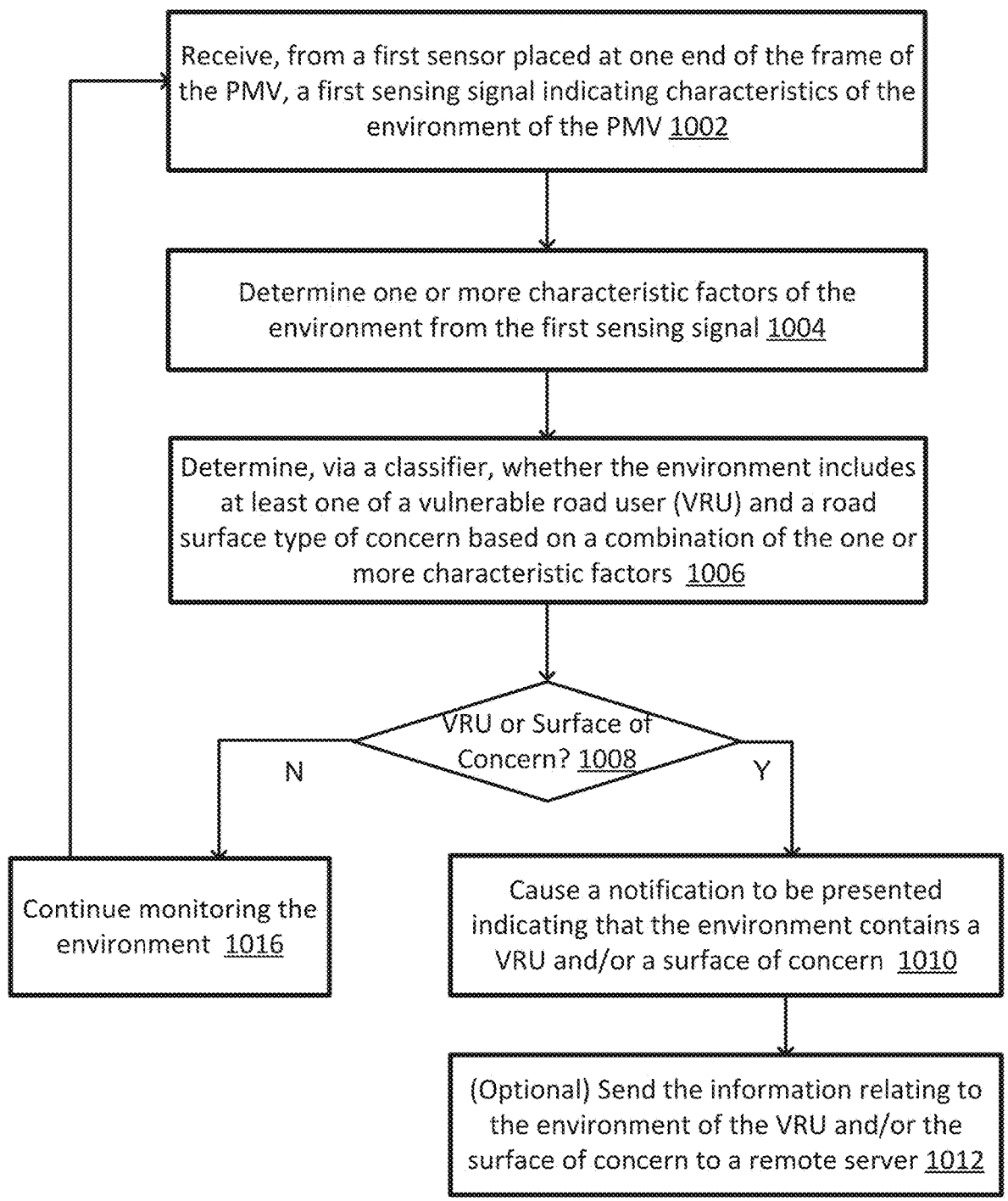
FIGS. 10A-10B provide logic flow diagrams illustrating processes performed by a PMV to determine whether an environment external to the PMV contains at least one of a VRU or a road surface type of concern, according to embodiments described herein.
Figure 10B:
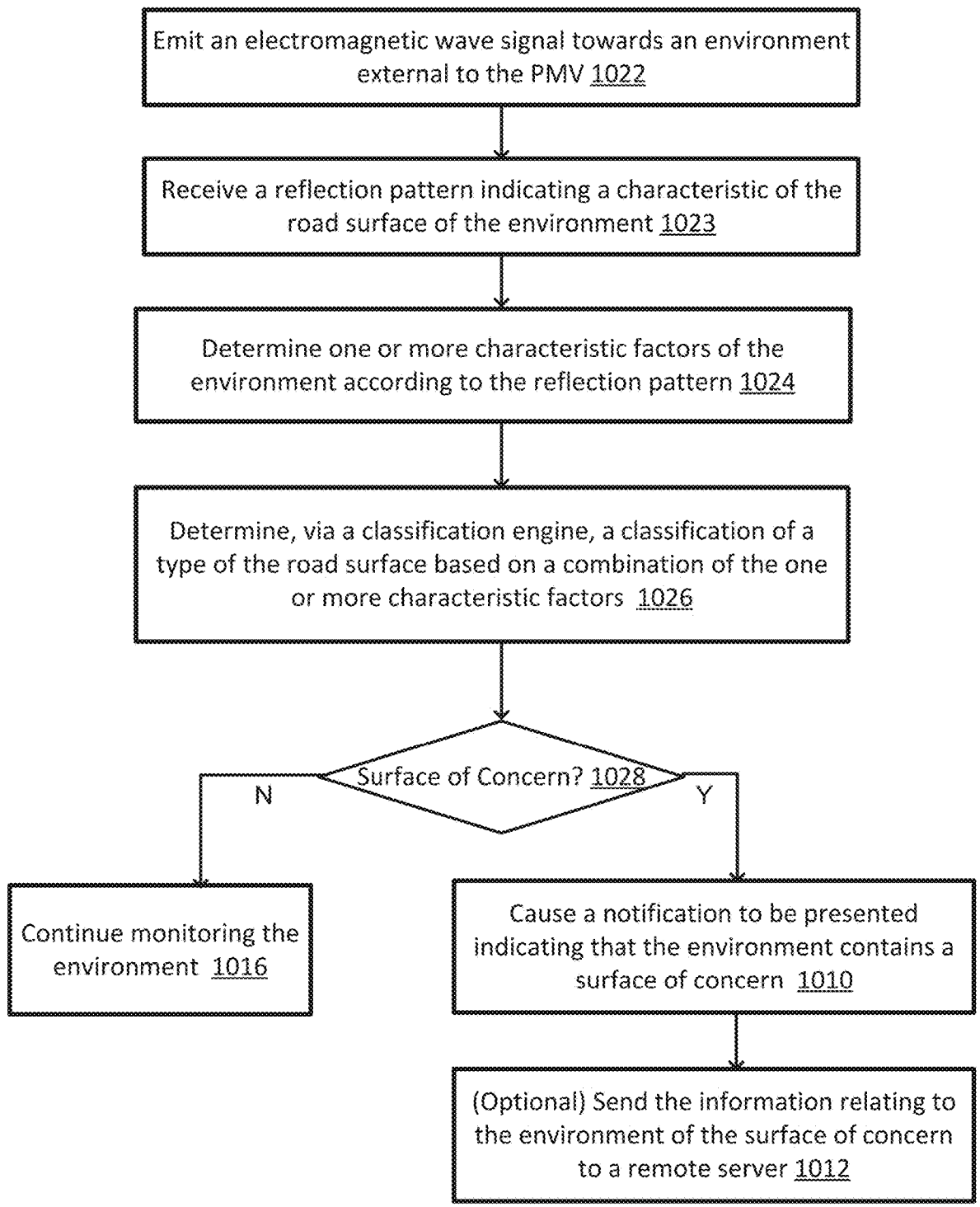

FIGS. 10A-10B provide logic flow diagrams illustrating methods 1000*a* and 1000*b* performed by a PMV to determine whether an environment external to the PMV contains at least one of a VRU or a road surface type of concern, according to embodiments described herein.

In FIG. 10A, method 1000*a* starts at step 1002, where a first sensing signal indicating characteristics of the environment of the PMV (e.g., 610 in FIG. 6) is received from a first sensor (e.g., 612 in FIG. 6) placed at one end of the frame of the PMV. For example, the first sensing signal may be a radar reflection signal and/or a sonar reflection signal. The first sensor may be any combination of a radar sensor, a sonar sensor, a camera, an IMU, and/or the like.

At step 1004, one or more characteristics of the environment from the first sensing signal are determined. For example, the one or more characteristics may include data factors 902-905, and/or data factors 906-910 shown in FIGS. 9A-9B.

At step 1006, a machine learning engine may determine whether the environment includes at least one of a VRU and/or a road surface type of concern based on a combination of the one or more characteristic factors.

At step 1008, if at least one of a VRU and/or a road surface type of concern is detected, method 1000*a* proceeds to step 1010, where an alert message (e.g., 935 in FIGS. 9A-9B) may be generated for display indicating that the environment contains a VRU and/or a surface of concern. For example, the alert message may include a recommended speed limit depending on a corresponding likelihood that the surrounding includes at least one of the VRU or the road surface type of concern. For another example, in addition to the alert message, a control signal may be transmitted to a control mechanism that controls one or more wheels, which limits a speed of the PMV depending on a corresponding likelihood that the environment includes at least one of a VRU or the road surface type of concern.

At step 1012, the information relating to the environment of the VRU and/or the surface of concern may be optionally sent to a remote server. For example, the PMV may be further equipped with a positioning unit configured to capture first location information of the PMV, and a transceiver configured to receive and transmit messages with the remote server. The PMV may transmit, to a remote server, determined information on whether the environment includes at least one of a VRU or the road surface type of concern and the first location information of the PMV, and/or receive, from the remote server, second location information and an indication on whether a corresponding location of the second location information contains at least one of another VRU or another road surface type of concern. The second location information and the indication are uploaded to the remote server by another PMV.

At step 1008, if no VRU or road surface type of concern is detected, method 1000*a* proceeds to step 1016, where the PMV continues monitoring the environment. Method 1000*a* may then repeat from step 1002.

In FIG. 10B, method 1000*b* starts with step 1022, at which a radar sensor (e.g., radar transmitting antenna 815*a* in FIG. 8A) may emit an electromagnetic wave signal towards an environment external to the PMV. In some implementations, a sonar sensor (e.g., 802 in FIG. 8A) may emit a sonar signal towards the road surface in the environment.

At step 1023, the radar sensor may receive a reflection signal of a reflection pattern indicating a characteristic of the road surface of the environment. For example, as described in FIGS. 8B-8C, the signal reflection pattern such as the backscattered signal power may carry information relating to the surface type.

At step 1024, one or more characteristic factors of the environment are determined according to the reflection pattern. For example, the one or more characteristic factors may include signal attenuation, signal mean power, signal power above a threshold, and/or the like.

At step 1026, a classification engine (e.g., machine learning classifier 720 in FIGS. 9A-9B) may determine a classification of a type of the road surface based on a combination of the one or more characteristic factors.

At step 1028, the method 1000b may determine whether the classified surface type belongs to a surface of concern, and then may proceed to steps 1012-1016 in a similar way as described in FIG. 10A.

Figure 11:
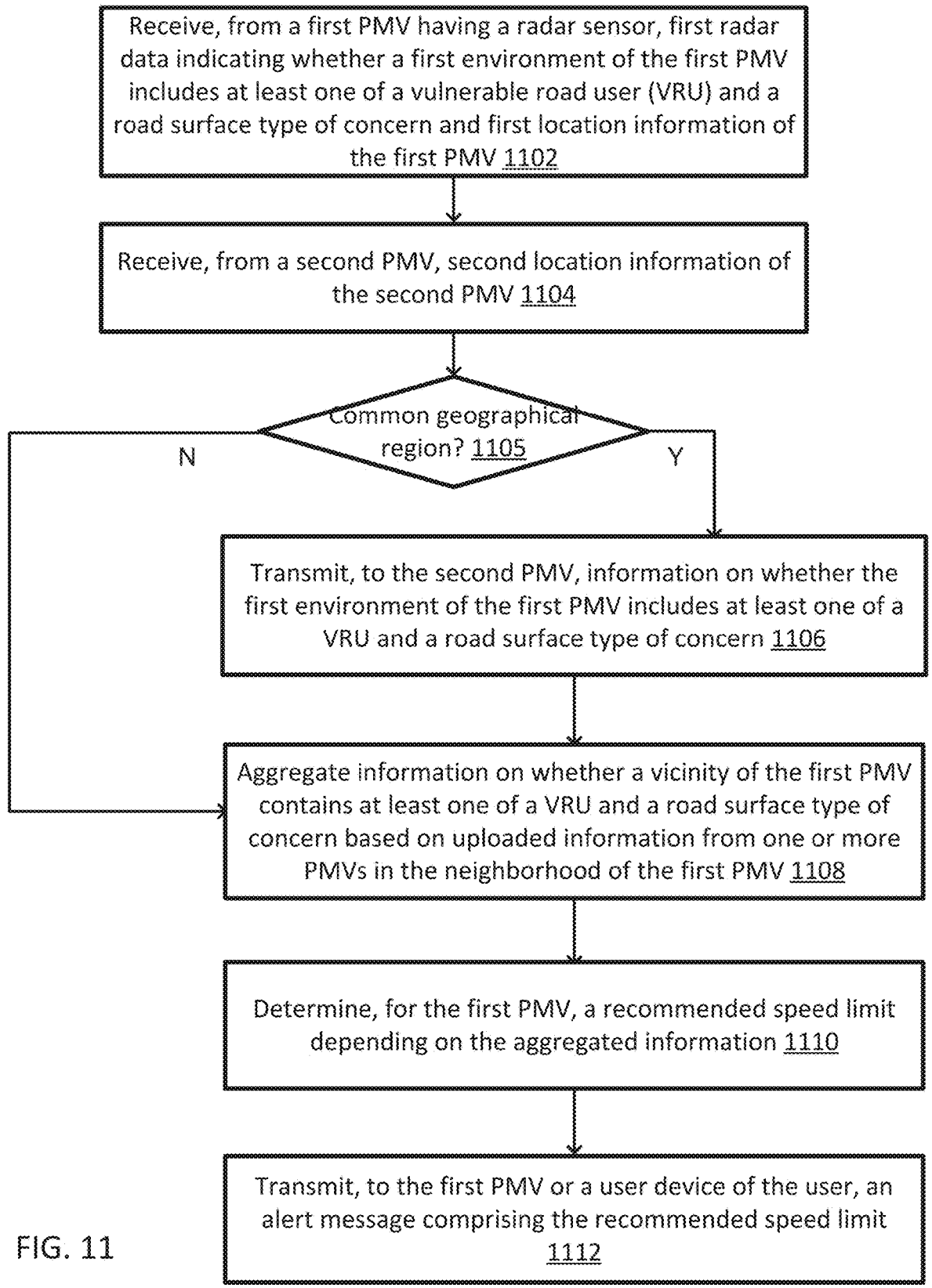
FIG. 11 provides a logic flow diagram illustrating a process performed by a remote server to collect and share information obtained from a plurality of PMVs on whether an environment external to the PMVs contains at least one of a VRU or a road surface type of concern, according to embodiments described herein.

FIG. 11 provides a logic flow diagram illustrating a process 1100 performed by a remote server to collect and share information obtained from a plurality of PMVs on whether an environment external to the PMVs contains at least one of a VRU or a road surface type of concern, according to embodiments described herein.

At step 1102, the remote server may receive, from a first PMV, a first signal indicating whether a first environment of the first PMV includes at least one of a vulnerable road user (VRU) or a road surface type of concern and first location information of the first PMV.

At step 1104, the remote server may receive, from a second PMV, a second signal indicating whether a second environment of the second PMV includes at least one of a VRU or a road surface type of concern and second location information of the second PMV. The first signal and the second signal may be received within a pre-defined period of time, such as 30 seconds, 60 seconds, and/or the like.

At step 1106, the remote server may transmit, to the first PMV, information on whether the second environment of the second PMV includes at least one of a VRU or a road surface type of concern and the second location information. In this way, the remote server may share road condition such as VRU location and road surface type among a group of PMVs that are clustered in vicinity to each other.

At step 1108, the remote server may aggregate information on whether a neighborhood of the first PMV contains at least one of a VRU or a road surface type of concern based on uploaded information from one or more PMVs in the neighborhood of the first PMV. For example, when information from both the first PMV and the second PMV indicates the existence of VRU, the area covering the first location and the second location may be determined to be a crowded area. For another example, when information from both the first PMV and the second PMV indicates a road surface type of concern, the area covering the first location and the second location may be determined to be associated with a road surface type of concern, and a lower speed limit may be recommended when any PMV is traveling within the area.

At step 1110, the remote server may determine, for the first PMV, a recommended speed limit depending on the aggregated information. For example, the recommended speed limit may be determined based on the number of detected VRU(s), the road surface type, and/or the like.

At step 1112, the remove server may transmit, to the first PMV or a user device of the user, an alert message comprising the recommended speed limit. In another implementation, the remote server may determine and send a mobility parameter (e.g., 945 in FIG. 9B) to the first PMV, as described in relation to FIG. 9B.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising, by a computing system:
obtaining, via one or more sensors of a personal mobile vehicle (PMV), a reflection signal indicating a characteristic of a road surface of an environment external to the PMV;
determining one or more characteristic factors of the road surface of the environment external to the PMV based on the reflection signal;
generating a vulnerable road user (VRU) classification probability distribution by using a machine learning classifier, wherein the VRU classification probability distribution indicates whether a combination of the one or more characteristic factors is associated with the VRU;
determining, based on the VRU classification probability distribution, that the road surface is associated with the VRU; and
presenting an alert message to a display associated with the PMV.

2. The computer-implemented method of claim 1, further comprising: training the machine learning classifier to generate the VRU classification probability distribution.

3. The computer-implemented method of claim 2, wherein training the machine learning classifier comprises: accessing a plurality of characteristic factors of objects in a particular environment, wherein each combination of characteristic factors is annotated with a corresponding ground-truth label indicating whether an object is associated with the VRU; inputting the plurality of characteristic factors of the objects into the machine learning classifier; using the machine learning classifier to generate the VRU classification probability distribution; comparing
the VRU classification probability distribution with the ground-truth label; and updating the machine learning classifier based on comparison.

4. The computer-implemented method of claim 1, further comprising: receiving one or more signals from one or more other PMVs that are in a vicinity of the PMV, the one or more signals indicating existence of the VRU; aggregating information on whether a neighborhood of the PMV contains
the VRU based on the one or more signals received from the one or more other PMVs that are in the vicinity of the PMV; and determining a recommended speed limit for the PMV based on aggregated information, wherein the alert message comprises the recommended speed limit.

5. The computer-implemented method of claim 4, wherein the reflection signal and the one or more signals from the one or more other PMVs are received within a pre-defined period of time.

6. The computer-implemented method of claim 1, further comprising: transmitting, to one or more other PMVs that are in a vicinity of the PMV, information regarding the road surface of the environment external to the PMV being associated with the VRU.

7. The computer-implemented method of claim 1, wherein the one or more characteristic factors of the road surface of the environment external to the PMV comprise: a doppler velocity of one or more nearby objects; height information of the one or more nearby objects; visual information of the one or more nearby objects; or an acceleration rate of the one or more nearby objects.

8. The computer-implemented method of claim 1, wherein the computing system comprises one or more of: a processing unit of the PMV, the processing unit being communicatively coupled to the one or more sensors of the PMV; or a remote server.

9. The computer-implemented method of claim 1, further comprising: in response to determining that the road surface is associated with the VRU, generating a mobility parameter to apply to a brake mechanism or a wheel control mechanism of the PMV to control a speed of the PMV.

10. The computer-implemented method of claim 1, further comprising: generating a road surface type classification distribution by using a second machine learning classifier to process the one or more characteristic factors of the road surface of the environment, wherein the road surface type classification distribution represents probabilities of the road surface belonging to one or more road surface types; and determine, based on the road surface type classification distribution, that the road surface is associated with a predetermined road surface type of concern.

11. The computer-implemented method of claim 10, further comprising: in response to a determination that the road surface is associated with the predetermined road surface type of concern or the VRU, determine a recommended speed limit for the PMV to operate on the predetermined road surface type of concern.

12. The computer-implemented method of claim 10, further comprising: training the second machine learning classifier to generate the road surface type classification distribution.

13. The computer-implemented method of claim 12, wherein training the second machine learning classifier comprises: accessing a plurality of characteristic factors of objects in a particular environment, wherein each combination of characteristic factors is annotated with a corresponding ground-truth label of a specific surface type; inputting the plurality of characteristic factors of the objects into the second machine learning classifier; using the machine learning classifier to generate the road surface type classification distribution; comparing the road surface type classification distribution with the ground-truth label; and updating the second machine learning classifier based on comparison.

14. The computer-implemented method of claim 10, wherein the one or more characteristic factors of the road surface of the environment external to the PMV comprise: a signal mean power of the reflection signal; a signal attenuation of the reflection signal; velocity information of one or more nearby objects; visual information of the one or more nearby objects; or power information indicating power above a certain threshold.

15. The computer-implemented method of claim 1, wherein the alert message comprises one or more of: an alert of an existence of the VRU in a vicinity of the PMV; or a recommended speed limit for the PMV in view of
the VRU being in the vicinity of the PMV.

16. The computer-implemented method of claim 1, wherein the one or more sensors comprise one or more of: a radar sensor; or a sonar sensor.

17. The computer-implemented method of claim 1, wherein the reflection signal comprises one or more of: a radar electromagnetic wave signal; or an ultrasonic signal.

18. The computer-implemented method of claim 1, wherein the one or more sensors are mounted at various orientations and in various parts of a frame of the PMV.

19. A non-transitory processor-readable medium storing processor-executable instructions, the processor-executable instructions executed by a processor to perform operations comprising:

obtaining, via one or more sensors of a personal mobile vehicle (PMV), a reflection signal indicating a characteristic of a road surface of an environment external to the PMV;

determining one or more characteristic factors of the road surface of the environment external to the PMV based on the reflection signal;

generating a vulnerable road user (VRU) classification probability distribution by using a machine learning classifier, wherein the VRU classification probability distribution indicates whether a combination of the one or more characteristic factors is associated with the VRU;

determining, based on the VRU classification probability distribution, that the road surface is associated with the VRU; and presenting an alert message to a display associated with the PMV.

20. A personal mobile vehicle (PMV) comprising:

a frame carrying a wheel;

one or more sensors carried by the frame of the PMV; and a processing unit communicatively coupled to the one or more sensors, the processing unit being configured to:

obtain, via the one or more sensors, a reflection signal indicating a characteristic of a road surface of an environment external to the PMV;

determine one or more characteristic factors of the road surface of the environment external to the PMV based on the reflection signal;

generate a vulnerable road user (VRU) classification probability distribution by using a machine learning classifier, wherein the VRU classification probability distribution indicates whether a combination of the one or more characteristic factors is associated with the VRU;

determine, based on the VRU classification probability distribution, that the road surface is associated with the VRU; and present an alert message to a display associated with the PMV.

* * * * *